(12) United States Patent
Abiko et al.

(10) Patent No.: US 7,627,150 B2
(45) Date of Patent: Dec. 1, 2009

(54) BIOMETRIC INFORMATION OBTAINING APPARATUS AND BIOMETRIC INFORMATION VERIFICATION APPARATUS

(75) Inventors: Yukihiro Abiko, Kawasaki (JP); Yusaku Fujii, Kawasaki (JP); Takashi Morihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/018,601

(22) Filed: Dec. 22, 2004

(65) Prior Publication Data
US 2005/0100200 A1 May 12, 2005

Related U.S. Application Data

(63) Continuation of application No. PCT/JP02/09501, filed on Sep. 17, 2002.

(51) Int. Cl.
G06K 9/00 (2006.01)
G06K 9/36 (2006.01)
G09G 5/00 (2006.01)

(52) U.S. Cl. .................. 382/124; 382/284; 345/629

(58) Field of Classification Search ............ 382/124, 382/284; 345/629
See application file for complete search history.

(56) References Cited

U.S. PATENT DOCUMENTS

| | | | | |
|---|---|---|---|---|
| 4,635,293 A | * | 1/1987 | Watanabe | 382/130 |
| 4,784,484 A | * | 11/1988 | Jensen | 356/71 |
| 5,629,988 A | * | 5/1997 | Burt et al. | 382/276 |
| 5,719,970 A | | 2/1998 | Aoki et al. | |
| 5,838,837 A | * | 11/1998 | Hirosawa et al. | 382/284 |
| 5,844,287 A | | 12/1998 | Hassan et al. | |
| 5,999,662 A | * | 12/1999 | Burt et al. | 382/284 |
| 6,064,753 A | | 5/2000 | Bolle et al. | |

(Continued)

FOREIGN PATENT DOCUMENTS

EP  1 179 801  2/2002

(Continued)

OTHER PUBLICATIONS

English translation of PCT International Preliminary Examination Report (PCT/IPEA/409) of International Application PCT/JP02/09501.

(Continued)

*Primary Examiner*—Brian P Werner
*Assistant Examiner*—Kathleen S Yuan
(74) *Attorney, Agent, or Firm*—Staas & Halsey LLP

(57) ABSTRACT

The object is to obtain undistorted images in high speed using a small amount of memory capacity, to realize high-quality characteristic information verification. The apparatus, which obtains information needed for user verification from partial images that are successively captured by a sweep-type fingerprint sensor from a fingertip, includes image obtaining means which captures successive partial images of biometric information; characteristic extracting means which obtains, from the captured partial images, characteristics and positions of the characteristics; detecting means which detects relative position information of partial images based on characteristics contained in a region in which the partial images overlap; and correcting means which calculates the amount of distortion of the characteristics based on the detected relative position information and on the positions of the characteristics in each partial image, and which corrects the positions of the characteristics in each individual partial image based on the calculated distortion amount.

27 Claims, 21 Drawing Sheets

U.S. PATENT DOCUMENTS

| | | | |
|---|---|---|---|
| 6,289,114 B1 * | 9/2001 | Mainguet | 382/124 |
| 6,317,508 B1 | 11/2001 | Kramer et al. | 382/124 |
| 6,546,122 B1 * | 4/2003 | Russo | 382/125 |
| 6,766,040 B1 * | 7/2004 | Catalano et al. | 382/115 |
| 7,031,501 B2 * | 4/2006 | Adachi et al. | 382/124 |
| 7,260,246 B2 | 8/2007 | Fujii | |
| 2001/0031075 A1 * | 10/2001 | Fujii | 382/125 |
| 2002/0003892 A1 * | 1/2002 | Iwanaga | 382/124 |
| 2002/0120195 A1 * | 8/2002 | Hossack et al. | 600/443 |
| 2002/0126883 A1 | 9/2002 | Senior | |
| 2003/0002717 A1 * | 1/2003 | Hamid | 382/124 |
| 2003/0021451 A1 * | 1/2003 | Lee | 382/124 |
| 2003/0123715 A1 | 7/2003 | Uchida | 382/124 |
| 2003/0156744 A1 | 8/2003 | Hashimoto | 382/124 |

FOREIGN PATENT DOCUMENTS

| | | |
|---|---|---|
| JP | 8-88778 | 4/1996 |
| JP | 8-263631 | 10/1996 |
| JP | 9-126918 | 5/1997 |
| JP | 10-91769 | 4/1998 |
| JP | 2000-99740 | 4/2000 |
| JP | 2001-155137 | 6/2001 |
| JP | 2001-177714 | 6/2001 |
| JP | 2002-42136 | 2/2002 |
| JP | 2002-74353 | 3/2002 |
| JP | 2002-109543 | 4/2002 |
| JP | 2002-216116 | 8/2002 |
| JP | 2003-208620 | 7/2003 |
| JP | 2003-242489 | 8/2003 |
| WO | WO 99/04550 | 1/1999 |
| WO | WO 99/63476 | 12/1999 |
| WO | WO 00/22565 | 4/2000 |
| WO | WO 01/80167 | 10/2001 |
| WO | WO 01/87159 | 11/2001 |

OTHER PUBLICATIONS

Japanese Patent Office Notice of Ground of Rejection mailed Jun. 20, 2006 for Japanese Patent Application No. 2004-537499.

Supplementary European Search Report Jun. 14, 2007.

Supplementary European Search Report, mailed dated Jun. 14, 2007, and issued in corresponding European counterpart Patent Application No. 02763032.6.

Japanese Office Action issued Jul. 10, 2009 in corresponding Japanese Patent Application 2006-223298.

* cited by examiner

ASPECT RATIO : 1

ASPECT RATIO : <1

INITIATION OF SWEEP ial Application PCT/JP2002/
BIOMETRIC INFORMATION OBTAINING APPARATUS AND BIOMETRIC INFORMATION VERIFICATION APPARATUS This application is a continuation application, filed under 35 USC 111(a), of International Application PCT/JP2002/009501, filed Sep. 17, 2002.

BACKGROUND OF THE INVENTION

1. Field of the Invention

The present invention relates to an apparatus for obtaining biometric information such as fingerprints, palm prints, and blood vessel patterns. The invention relates particularly to a biometric information obtaining apparatus which obtains information needed for user verification from partial images (fingerprint images) that are successively obtained while a finger is moving relative to the sensor surface (image capturing surface) of a sweep-type fingerprint sensor. Further, the present invention relates to a verification apparatus on which user verification is performed using biometric information such as fingerprints, palm prints, and blood vessel patterns.

2. Description of the Related Art

With recent improvement in functionality, small-sized information equipment, such as mobile phones and PDAs (Personal Digital Assistants), is capable of connecting to communication networks and storing a great amount of personal information, thereby increasing the demand for improvement in security of the equipment.

To realize the security of the equipment, passwords and ID (Identification) cards have been used for user verification. However, since such passwords and ID cards are easily stolen, more reliable user verification (confirmation that an object user is an authorized user who has been registered beforehand) has been strongly desired. To meet this demand, use of biometric user verification, which is highly reliable in verification, is conceivable. In particular, fingerprints are convenient for users.

When a fingerprint is used as biometric information for user verification, a fingerprint sensor of an electrostatic capacity type or of an optical type is used to obtain image information of a fingerprint (a pattern formed of fingerprint ridges that contact the image-capturing surface of the fingerprint sensor and valley lines that do not contact the image-capturing surface) from a fingertip of a user. Characteristic information (for example, position information of bifurcations and endpoints) is extracted from the foreground (for example, fingerprint ridge images) of the fingerprint image, and the extracted characteristic information is verified against the user's characteristic information that has been registered beforehand, thereby carrying out authentication of the user.

Fingerprint sensors commonly used have a sensor surface (image-capturing surface) larger than a human fingertip. However, recent fingerprint sensors are given a sensor surface that is smaller than a human fingertip, to make it possible to provide such fingerprint sensors to small-sized information equipment such as mobile phones and PDAs. Partial images of a fingerprint, which are successively obtained through such a small-sized sensor surface, are combined to obtain the whole fingerprint image.

A sweep-type fingerprint sensor is one of such fingerprint sensors with a small-sized sensor surface. A sweep-type fingerprint sensor has a small-sized rectangular image-capturing surface (sensor surface/image capturing surface) which is sufficiently shorter in length than a fingertip. The fingerprint sensor successively obtains partial images of a fingerprint, while an object fingertip is moving relative to the image-capturing surface, or while the image-capturing surface is moving relative to the fingertip, and the whole image of the fingerprint is reproduced from the partial images. Here, such movement of a finger relative to the image-capturing surface is called "sweep". Fingerprint minutiae (ridge bifurcations and ridge endpoints) are extracted/generated from the thus reproduced fingerprint image, and user verification is performed based on the minutiae information.

Techniques of reproducing the whole fingerprint image from fingerprint partial images are disclosed in, for example, Japanese Patent Application Publication No. HEI 8-263631 and Japanese Patent Application Publication No. 2001-155137. In the techniques disclosed in these patent applications, a relative position between a finger and a sensor in a direction orthogonal to the lengthwise direction of the sensor is obtained to reproduce the whole image of the finger. In techniques disclosed in U.S. Pat. Nos. 6,289,114 and 6,317,508, overlap between images successively obtained is measured, and the whole finger image is reproduced based on the overlap.

However, since an image obtained by such a sweep-type fingerprint sensor and then reproduced is distorted due to varying factors, it is sometimes difficult to compare the fingerprint data obtained with a sweep-type fingerprint sensor and fingerprint data registered beforehand.

For example, fingerprint sensors in which a fingerprint image is obtained while a finger is moving on a sensor surface in contact with the sensor surface have the following problems. As will be described later with reference to FIG. 5 through FIG. 7, and FIG. 27 through FIG. 31, as a finger, which is flexible and three-dimensional, is pressed against a plane sensor surface, the finger is deformed, whereby a large distortion is caused in a fingerprint image. Further, since a portion of a finger sometimes adheres to the sensor surface due to friction between the sensor surface and the finger, the finger is deformed, whereby a large distortion is caused in a resulting fingerprint image. Such deformation depends on the direction in which a finger sweeps.

Further, as shown in FIG. 19 through FIG. 26, if an image-capturing device, which obtains an image of a fingerprint, has any detection delay, captured images are distorted irrespective of distortion of the finger itself. Taking an example of a sensor in which information is detected by one scanning line, and information is detected by the adjacent scanning line after elapse of a specific delay, (see FIG. 25), if relative position information between a finger and the sensor is greatly changed over time, an aspect ratio of a captured fingerprint image is changed, thereby causing an extractive/contractive distortion (see FIG. 21 through FIG. 24). Further, in a sensor in which detection delay appears for each cell (see FIG. 26), a skew distortion occurs (see FIG. 25 and FIG. 26).

Such distortion deteriorates the reproducibility of a reproduced image. Further, when partial images which are distorted in different ways are connected, patterns (images of sebum or sweat secreted from a finger, or images of flaws on the sensor surface, or an image due to a defect in a detector device) that do not actually exist in a fingerprint could appear. That is, characteristic information obtained from a user with a fingerprint sensor is significantly different from the user's registered characteristic information because of the distortion described above or the appearance of patterns that do not exist in a fingerprint. Thus, a false verification result could be obtained even if an object user to be verified is an authorized user, so that verification ability, that is, verification reliability, is deteriorated.

Further, in the techniques disclosed in the above Japanese patent applications and in the above U.S. patents, the following problems are also caused. In order to reproduce the whole fingerprint image from partial images obtained, a memory with a capacity enough to store the whole image of a finger needs to be provided, and the process time is also increased. Thus, the above techniques are not applicable to small-sized information equipment.

In view of this, the object of the present invention is to perform correction on characteristic information extracted from each partial image, thereby making it possible to obtain undistorted characteristic information using a memory with a small capacity. As a result, user verification is performed based on high-quality characteristic information, so that verification ability, that is, verification reliability, and user convenience are improved.

SUMMARY OF THE INVENTION

In order to accomplish the above object, according to the present invention, there is provided a biometric information obtaining apparatus, comprising: an image obtaining means which captures a plurality of successive partial images of successive portions of biometric information; a characteristic extracting means which obtains, from the individual partial image obtained by the image obtaining means, a characteristic contained in the individual partial image and a position of the characteristic; a relative position information detecting means which detects relative position information of two or more of the partial images, obtained by the image obtaining means, based on the characteristic contained in a region in which the two or more partial images overlap; and a correcting means (first correcting means) which calculates the amount of distortion of the characteristic based on the relative position information detected by the relative position information detecting means and on the position of the characteristic in the individual partial image, and which corrects the position of the characteristic in the individual partial image based on the calculated distortion amount.

Further, the biometric information obtaining apparatus of the present invention has an image obtaining means, a characteristic extracting means, and a relative position information detecting means, similar to the above, and the biometric information obtaining apparatus also has a correcting means (second correcting means) which corrects the position of the characteristic in the individual partial image, based on a time interval at which the image obtaining means obtains the individual partial image, on a delay in capturing the individual partial image by the image obtaining means, and on the relative position information detected by the relative position information detecting means, so that distortion of the individual partial image due to the delay in capturing the individual partial image by the image obtaining means is corrected.

Furthermore, the biometric information obtaining apparatus of the present invention has an image obtaining means, a characteristic extracting means, and a relative position information detecting means, similar to the above, and the biometric information obtaining apparatus also has a correcting means (third correcting means) that has both the function of the first correcting means and the function of the second correcting means.

The biometric information verification apparatus of the present invention has an image obtaining means, a characteristic extracting means, and a relative position information detecting means, similar to the above, and also has one of the first, the second, and the third correcting means. The biometric information obtaining apparatus also includes: a generating means which generates either or both of the registration data and the verification data for user verification, by using the characteristic extracted by the characteristic extracting means and the corrected position of the characteristic obtained by the correcting means; and a verifying means which performs verification processing, using either or both of the registration data and the verification data generated by the generating means, to verify the user.

Further, the above biometric information obtaining apparatus and biometric information verification apparatus may have the following constructions (1-1) through (1-15).

(1-1) The image obtaining means captures a plurality of successive partial images from an object that is moving relative to the image obtaining means, and the biometric information obtaining apparatus further includes a removing means which removes a pattern image that is contained in the plural partial images captured by the image obtaining means and that does not move, before the characteristic extracting means extracts the characteristic.

(1-2) In the above (1-1), the removing means calculates a weighted average image from partial images that have been captured by the time immediately before the object partial image is obtained, and the removing means separates moving patterns and non-moving patterns based on the weighted average image thus calculated, and removes the non-moving pattern.

(1-3) The characteristic extracting means extracts the foreground of each partial image and edges of the foreground as the above characteristic.

(1-4) The characteristic extracting means extracts, as the characteristic, an endpoint and a bifurcation in a pattern which is obtained by thinning the foreground of each partial image.

(1-5) The relative position information detecting means detects relative position information of two or more partial images, which are captured successively by the image obtaining means, based on one or more relative position information items which have been detected by the time immediately before the detection of the relative position information of the two or more partial images.

(1-6) The relative position information detecting means detects relative position information of two or more partial images, which are captured successively by the image obtaining means, based on a predicted relative position information to be detected next, the predicted relative position information being estimated based on one or more relative position information items which have been detected by the time immediately before the detection of the relative position information of the two or more partial images.

(1-7) The relative position information detecting means divides each of the two or more partial images, which are captured successively by the image obtaining means, into two or more partial regions which share a common overlapping area, and detects the relative position information separately in the divided two or more partial regions.

(1-8) The relative position information detecting means divides each of the two or more partial images, which are captured successively by the image obtaining means, into two or more partial regions which share a common overlapping area, and detects the relative position information separately in the divided two or more partial regions, and the correcting means corrects the position of the characteristic in the partial regions separately, so that distortion of each partial image due to a delay in capturing each partial image by the image obtaining means is corrected.

(1-9) The image obtaining means captures a plurality of successive partial images from an object that is moving with respect to the image obtaining means, and the biometric information obtaining apparatus further includes a moving object detecting means which detects the presence or absence of a moving object which is moving with respect to the image obtaining means, based on the plural partial images captured by the image obtaining means.

(1-10) In the above (1-9), a moving object detecting means calculates a weighted average image from partial images that have been captured by the time immediately before the object partial image is obtained, and the moving object detecting means detects the presence or absence of a moving object based on the weighted average image thus calculated.

(1-11) In the above (1-10), the moving object detecting means detects the presence of such a moving object when a difference value between the latest partial image obtained by the image obtaining means and the calculated weighted average image exceeds a specific threshold value, which is set to a value larger than a variation caused by a noise.

(1-12) In a verification apparatus having the above constructions (1-9) through (1-11), the verifying means does not perform verification process while no moving object is detected by the moving object detecting means.

(1-13) In a verification apparatus having the above constructions (1-9) through (1-11), the verifying means of the present embodiment preferentially uses characteristics obtained from partial images that are captured earlier and relative position information of the characteristics, to perform the verification process.

(1-14) The verifying means ends the verification process at the time a verification result of a user is confirmed.

(1-15) The image obtaining means captures a plurality of successive partial images from an object that is moving with respect to the image obtaining means while being in contact with the image obtaining means, and the biometric information obtaining apparatus further includes a friction reducing means which is operable to reduce friction caused by the movement of the object.

Further, the biometric information obtaining apparatus includes: an image obtaining means which captures a plurality of successive partial images from an object that is moving with respect to the image obtaining means while being in contact with the image obtaining means; and a friction reducing means which is operable to reduce friction caused by the movement of the object.

The foregoing biometric information obtaining apparatus and a biometric verification apparatus realize the following effects and benefits (2-1) through (2-16).

(2-1) Relative position information between two or more partial images is detected based on characteristics contained in an area (overlap area) in which the two or more partial images overlap. Based on the amount of distortion estimated from the relative position information and positions of the characteristics in each partial image, the positions of the characteristics in each partial image are corrected, whereby distortion caused by deformation of a finger at the time of capturing fingerprint partial images is removed. Hence, verification is performed using high-quality characteristic information, so that verification ability, that is, verification reliability, is improved.

(2-2) Relative position information between two or more partial images is detected based on characteristics contained in an area (overlap area) in which the two or more partial images overlap, and positions of the characteristics in each partial image are corrected based on the relative position information, on a time interval at which the image obtaining means obtains each partial image, and on a delay in capturing each partial image by the image obtaining means, so that distortion of the individual partial image due to the delay in capturing the individual partial image by the image obtaining means is corrected. This makes it possible to remove image distortion (expansive/contractive distortion and skew distortion) of the characteristic information caused by detection delay in a sweep-type finger print sensor. Thus, undistorted characteristic information is obtained, thereby making it possible to use high-quality characteristic information in user verification, so that verification ability, that is, verification reliability, is improved.

(2-3) By performing both of the correction (2-1) and the correction (2-2), both the distortion due to deformation of a finger itself when fingerprint partial images are obtained and the image distortion (expansive/contractive distortion and skew distortion) due to detection delay of a sweep-type fingerprint sensor are removed from characteristic information. This makes it possible to use high-quality characteristic information in user verification, so that verification ability, that is, verification reliability, is improved.

(2-4) Since correction is performed on characteristic information extracted from each partial image, it is not necessary to store each partial image as it is, so that undistorted characteristic information is obtained at high speed with a small amount of memory capacity.

(2-5) Verification processing is sequentially performed for an individual partial image in order in which correction of the positions of characteristics is completed. It is thus possible to perform accurate biometric information verification using a small-sized sensor, so that a user verification system convenient for users is realized.

(2-6) There is no need to obtain the whole biometric information distribution, and biometric user verification is available using only a small-sized sensor. Such small-sized biometric information sensors can be equipped to small-sized information equipment such as mobile phones and PDAs, in which a sufficient space for installing a sensor cannot be prepared, thereby improving security performance.

(2-7) If the image obtaining means is a sweep-type biometric information sensor, and if non-moving patterns in each partial image are removed, images of sebum, sweat, or moisture which adhere to the sensor surface, images of flaws on the sensor surface, and images due to defects of the detector devices forming a sensor, are removed from partial images as non-moving patterns (background). This prevents the forgoing non-moving patterns from appearing in partial images as patterns that do not exist in an actual fingerprint image, and thus, characteristic information unnecessary for verification will not be extracted, whereby verification ability is improved.

(2-8) The foreground (for example, the brightness of ridge images) and edges of the foreground (for example, brightness gradient) are extracted as characteristics, and relative position information is detected by using both of the foreground and the edges, whereby relative position information between partial images is accurately detected even when the partial images contain similar ridge patterns, so that the ability to detect the relative position information is improved.

(2-9) Endpoints and bifurcations in a pattern that is obtained by thinning the foreground (for example, ridge images) of each partial image are extracted. Relative position information is detected based on the thus extracted endpoints and bifurcations, thereby eliminating the necessity of extracting fingerprint minutiae from the whole fingerprint image when verification of characteristic information (in fingerprint endpoints and bifurcations) is carried out for user verification, and this will greatly reduce the process time. Further, since partial images from which characteristic information has once been extracted need not be stored in a memory, the partial images can be aborted, thereby reducing the amount of memory used.

(2-10) Relative position information of two or more partial images is detected based on one or more relative position information items that have been detected by the time immediately before the detection of the two or more partial images, whereby the number of times operations for detecting the relative position information are performed is reduced. That is, a range (search range) in which a correlation value is calculated to detect relative position information is limited to, for example, a range which extends along the sweep direction, and processing time required for detecting relative position information is reduced. At this time, if an interval at which the partial images are obtained is sufficiently short, the sweep direction will never be inverted suddenly, and the search range can be limited without deteriorating the ability of detecting the relative position information.

(2-11) Relative position information of two or more partial images is detected based on predicted relative position information that is to be detected next, which predicted relative position information is estimated based on one or more relative position information items which have been detected by the time immediately before the detection of the relative position information of the two or more partial images, whereby, as in the above (2-10), the number of times operations for detecting the relative position information are performed is reduced. That is, if an interval at which partial images are obtained is sufficiently short, it can be assumed that the sweep direction and the sweep speed will never be significantly changed suddenly, so that the next search range can be limited based on the relative position information obtained by the time immediately before the detection of the relative position information of the two or more partial images. Accordingly, the time required for detecting relative position information is reduced, without deteriorating the ability of detection of the relative position information even when the search range is limited.

(2-12) Each of the two or more partial images is divided into two or more partial regions which share a common overlapping area, and relative position information is separately detected in the divided two or more partial regions. As a result, even if a fingertip from which partial fingerprint images are obtained is significantly deformed, relative position information of every part of the fingertip is still accurately detected.

(2-13) When a sweep-type biometric information sensor is used to obtain successive partial images, the presence or absence of a moving object (for example, a finger), which moves with respect to a biometric information sensor, is detected based on partial images obtained by the biometric information sensor. This eliminates the necessity of preparing a separate sensor for detecting a moving object, and it becomes possible to detect such a moving object without additional cost, thereby increasing practicality. At that time, a weighted average image of partial images that have been obtained by the time immediately before the current partial image is obtained is calculated. If a difference value between the weighted average image and the latest partial image exceeds a specific threshold, it is decided that the presence of a moving object has been detected. At this time, if the weighted average image that was calculated at removing a non-moving image (background) is used as it is, it becomes possible to detect a moving object without increasing the amount of calculation. In addition, the above specific threshold is set to a value greater than a variation due to a noise, thereby preventing such a noise from being erroneously detected as a moving object, and the ability to detect a moving object is thus improved.

(2-14) Since a verification process need not be performed for non-moving objects, the verification process is not carried out while no moving object is detected. That is, the verification process is not initiated while no moving object is detected, and the verification process is performed only while any moving object is being detected. This makes it possible to reduce the time and load required for calculation. In addition, since characteristic information extracted from a noise is prevented from being used in the verification process, verification ability will not be deteriorated.

(2-15) A verification process is performed preferentially using characteristics and relative position information obtained from partial images that have been captured at an early stage, and the verification process is ended when a verification result is confirmed. As a result, characteristics are sequentially generated from partial images in the order in which the partial images are input by a sweep action, so that it is possible to initiate a verification process without waiting for the characteristics of the whole image to be obtained. Further, the verification can be terminated at an early stage when a result of the verification is established.

(2-16) Taking an example of a sensor, such as a sweep-type biometric information sensor, which successively obtains partial images from an object (a body part of a user to be verified) that is moving with respect to the sensor surface while being in contact with the sensor surface, if the sensor is equipped with a friction reducing means for reducing friction generated by the movement of the object, it is possible to facilitate the sweep action of the body part, thereby improving user convenience. Further, since deformation of the body part is reduced, it is possible to obtain biometric information images with high reproducibility, so that verification ability is improved.

DESCRIPTION OF THE PREFERRED EMBODIMENT

One preferred embodiment of the present invention will now be described with reference to the relevant accompanying drawings.

[1] Verification Apparatus of the Present Embodiment

Figure 1:
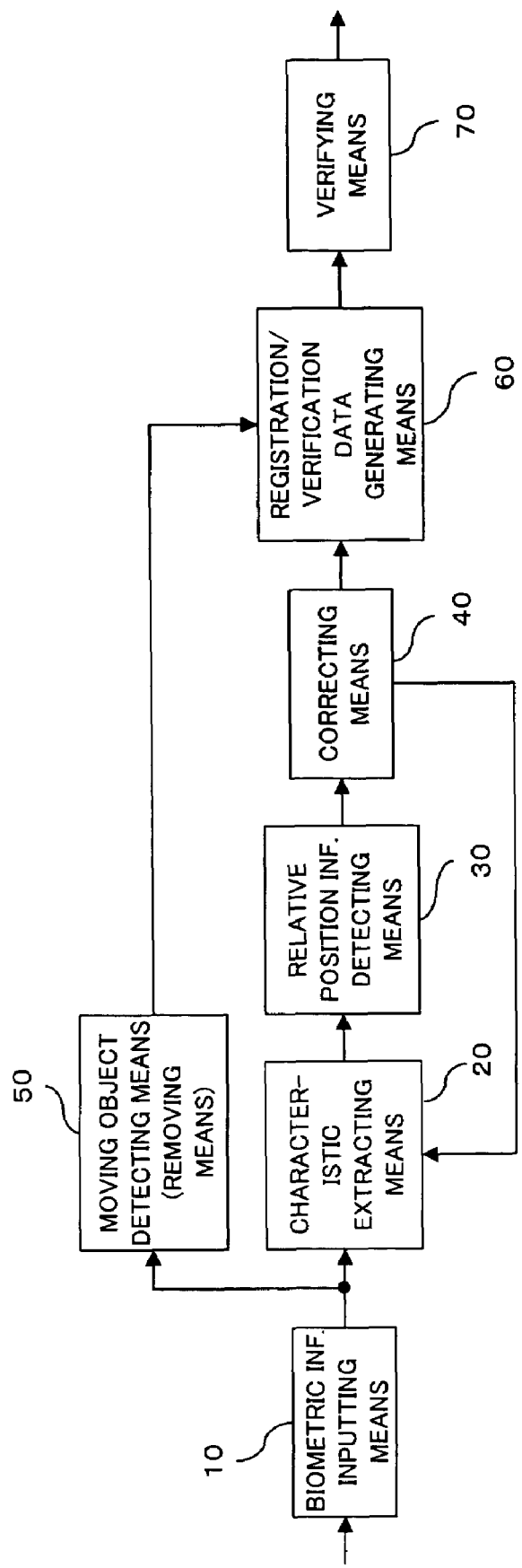
FIG. 1 is a block diagram showing a functional construction of a biometric verification apparatus according to one preferred embodiment of the present invention.
Figure 2:
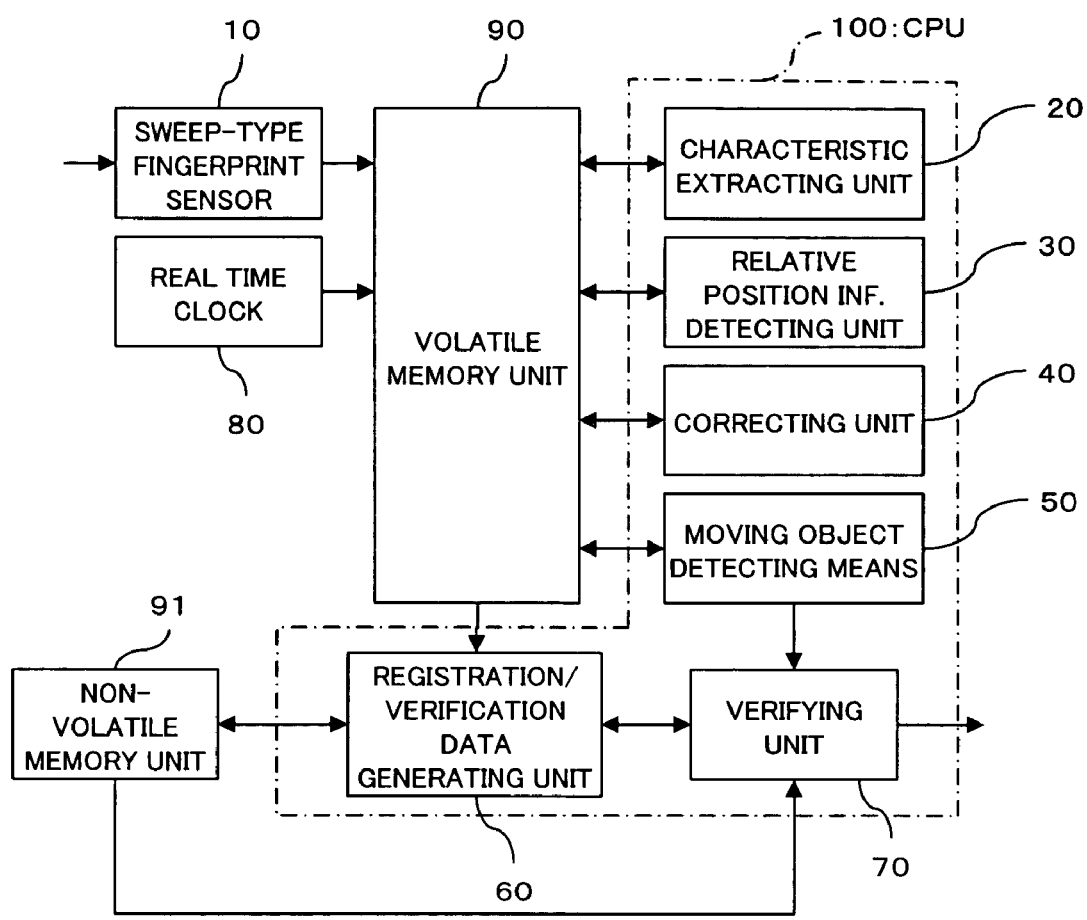
FIG. 2 is a block diagram showing a specific construction of the biometric verification apparatus of the present embodiment.

Both FIG. 1 and FIG. 2 show a construction of a biometric user verification apparatus (biometric information obtaining apparatus) according to one preferred embodiment of the present invention. FIG. 1 is a block diagram showing a functional construction (principle construction) of a biometric verification apparatus according to one preferred embodiment of the present invention. FIG. 2 is a block diagram showing a specific construction of the biometric verification apparatus. In FIG. 1 and FIG. 2, like reference numbers and characters designate similar parts or elements.

As shown in FIG. 1, the verification apparatus of the present embodiment has functions as a biometric information inputting means (image obtaining means) 10, a characteristic extracting means 20, a relative position information detecting means 30, a correcting means 40, a moving object detecting means (removing means) 50, a generating means 60, and a verifying means 70.

As shown in FIG. 2, the verification apparatus is realized by a common personal computer, having a real time clock 80, a volatile memory 90, and a non-volatile memory 91, and a CPU (Central Processing Unit) 100, with a sweep-type fingerprint sensor 10 [biometric information inputting means (image obtaining means)] of an electrostatic capacity type attached thereto. At that time, the CPU 100 executes specific programs to function as a characteristic extracting unit (characteristic extracting means) 20, a relative position information detecting unit (relative position information detecting means) 30, a correcting unit (correcting means) 40, a moving object detecting unit (moving object detecting means/removing means) 50, a registration/verification data generating unit (generating means) 60, and a verifying unit (verifying means) 70 (detailed later).

The sweep-type fingerprint sensor 10 of an electrostatic capacity type captures successive partial images of biometric information of a user to be verified. More precisely, the sweep-type fingerprint sensor 10 captures successive partial images of the user's finger (object; see item 200 of FIG. 3 through FIG. 7, FIG. 32, and FIG. 33) while the finger is moving relative to the image capturing surface (sensor surface) 11.

The "fingerprint" is a pattern on the skin of a finger of a user to be verified, which pattern is formed of ridge lines (contacting parts), which contact the sensor surface 11, and valley lines (non-contacting parts/gap parts), which do not contact the sensor surface 11. Utilizing the difference in detection sensitivity between the ridge lines, which contact with the sensor surface 11, and the valley lines, which do not contact with the sensor surface 11, partial images of a fingerprint are captured as multilevel images. In such multilevel images, the brightness depends on the distance from the sensor. Generally speaking, ridge lines are displayed in lower brightness since they are close to the sensor, whereas valley lines are displayed in higher brightness since they are comparatively far from the sensor.

At the time of fingerprint verification, a user passes his finger over the sensor surface 11 of the fingerprint sensor 10 while keeping his finger in contact the sensor surface 11. The user moves his finger in an arbitrary direction, from the side of the root of the finger to the side of the tip of the finger, or from the right side to the left side of the finger. Here, if the fingerprint sensor 10 is movable in relation to the finger, the user does not need to move his finger. Now a description will be made, referring to FIG. 3, FIG. 4, FIG. 6, and FIG. 7, of a case where a finger 200 is swept from the side close to the root of the finger toward the tip of the finger. A construction of the fingerprint sensor 10 will be detailed later with reference to FIG. 19 and FIG. 20.

The real time clock 80 is used to add time stamps to the partial images successively captured by the fingerprint sensor 10.

The volatile memory 90 stores successive partial images obtained by the fingerprint sensor 10, characteristics, relative position information, and correction results obtained by the CPU 100, and various kinds of parameters (for example, parameters for use in correction in the process performed by the correcting unit 40) required for realizing the function of the verification apparatus of the present embodiment.

The non-volatile memory 91 stores fingerprint data which is obtained/registered from users to be verified at user enrolment. The fingerprint data in the non-volatile memory 91 may be data extracted from an image obtained by a common type of fingerprint sensor the size of whose sensor surface is greater than the size of a normal human finger, or alternatively, it may be data which is generated by the registration/verification data generating unit 60.

The characteristic extracting unit (characteristic extracting means) 20 extracts, from partial images captured by the fingerprint sensor 10, characteristics contained in the partial images and positions of the characteristics. Here, such characteristics may be both the foreground of each partial image (the brightness value of ridge images in the present embodiment; see FIG. 13) and the edges of the foreground (brightness gradient values in the present embodiment; see FIG. 14), or may be end points and bifurcations extracted in patterns that are obtained by thinning the foreground (ridge images in the present embodiment) of each partial image as will be detailed later with reference to FIG. 15.

The relative position information detecting unit 30 detects relative position information of two or more of the partial images, which are successively obtained by the fingerprint sensor 10, based on characteristics (extracted by the characteristic extracting unit 20) contained in a region in which the two or more partial images overlap. At this time, the relative position information detecting unit 30 may detect the relative position information based on one or more relative position information items which have been detected by the time immediately before the detection of the relative position information of the two or more object images. Alternatively, as will be detailed later with reference to FIG. 16, the detection may be performed based on a predicted relative position information which is to be detected next, the predicted relative position information being estimated based on one or more relative position information items which have been detected by the time immediately before the relative position information of the two or more object partial images is detected. Further, as will be detailed later with reference to FIG. 17 and FIG. 18, the relative position information detecting unit 30 may divide each of the partial images, which are captured successively by the fingerprint sensor 10, into two or more partial regions which share a common overlapping area, and detect the relative position information separately in the divided two or more partial regions.

The correcting unit 40 corrects image distortion caused by detection delay of the fingerprint sensor 10 and distortion due to deformation of a finger. The correcting unit 40 has the following two types of correction functions. As will be described with reference to FIG. 3 through FIG. 7 and FIG. 27 through FIG. 31, the first correction function is to calculate the amount of distortion (the amount of distortion caused by the deformation of the finger) based on the relative position information detected by the relative position information detecting unit 30 and on positions of the characteristics contained in each partial image, and to correct the positions of the characteristics based on the calculated distortion amount. The second correction function is to correct positions of characteristics in each partial image, based on a time interval at which each partial image is obtained by the fingerprint sensor 10, on a delay in capturing each partial image by the fingerprint sensor 10, and on the relative position information detected by the relative position information detecting unit 30, so that distortion (expansive/contractive distortion and skew distortion) of each partial image due to the delay in capturing the individual partial image by the fingerprint sensor 10 is corrected.

Here, if the relative position information detecting unit 30 divides each of the successive partial images obtained by the fingerprint sensor 10 into two or more partial regions which share a common overlapping area, to detect the above relative position information in each of the partial regions, the correcting unit 40 performs correction of the positions of characteristics in each of the partial regions, so that distortion of each partial region due to a delay in capturing the individual partial image by the fingerprint sensor 10 is corrected.

The moving object detecting unit (moving object detecting means/removing means) 50 detects the presence or absence of a moving object (a finger of a user in this example) which is moving in relation to the fingerprint sensor 10, based on partial images captured by the fingerprint sensor 10. The moving object detecting unit 50 calculates a weighted average image from partial images that have been captured by the time immediately before the object partial image is obtained, and detects the presence or absence of the moving object in the object partial image based on the thus calculated weighted average image. More precisely, the moving object detecting unit 50 detects the presence of such a moving object when a difference value between the object (latest) partial image obtained by the fingerprint sensor 10 and the calculated weighted average image exceeds a specific threshold value, which is larger than a variation caused by a noise. Further, verification process (will be described later) which is performed by the verifying unit 70 is not carried out in the present embodiment, unless the moving object detecting unit 50 detects any moving object.

Furthermore, the moving object detecting unit 50 has a function as a removing means which removes, from partial images obtained by the fingerprint sensor 10, pattern images that do not move. With this function, as will be described later with reference to FIG. 8 through FIG. 12, a weighted average image is calculated from partial images that have been captured by the time immediately before the object partial image is obtained, and based on the calculated weighted average image, non-moving objects are separated from moving objects so as to be removed.

The registration/verification data generating unit (generating means) 60 generates fingerprint data [data to be registered (registration data) and data to be verified (verification data)] to be used in user verification, using the characteristics extracted by the characteristic extracting means 20 and the position information after correction by the correcting unit 40. When fingerprint data is registered at enrolment, the fingerprint data (publicly known information such as positions of ridge bifurcations and ridge endpoints and their patterns) generated by the registration/verification data generating unit 60 is stored/registered in the non-volatile memory 91 as registration data. Later, at user verification, the fingerprint data generated by the registration/verification data generating unit 60 is sent to the verifying unit 70 as verification data.

The verifying unit (verifying means) 70 compares the verification data generated by the registration/verification data generating unit 60 with the registered data stored in the non-volatile memory 91, to carryout verification processing for user verification. This verifying unit 70 performs the verification process, preferentially using the characteristic and the relative position information which are obtained from a partial image captured early in time (based on time stamps given by the real time clock 80) by the fingerprint sensor 10. When a verification result is established, the verifying unit 70 finishes the verification process.

As will be detailed later with reference to FIG. 32 through FIG. 35, there are provided friction reducing means 15 through 18 around the sensor surface 11 of the fingerprint sensor 10, which friction reducing means reduces friction caused by the movement of the finger 200 while it is in contact with the sensor surface 11.

[2] Detailed Construction of the Verification Apparatus and the Operation and the Effects of the Same Referring to FIG. 3 through FIG. 35, a more detailed construction of the verification apparatus of the present embodiment will be described hereinbelow.

[2-1] Sweep-Type Fingerprint Sensor and Verification Apparatus of the Present Embodiment As will be described later, the verification apparatus of the present embodiment realizes a function of obtaining distribution of biometric characteristic information (distribution of fingerprint minutiae) which is to be used in verification, without necessity of reconstructing the whole biometric information image (hereinafter will be called the "whole image") from partial images obtained by the sweep-type fingerprint sensor 10.

As already mentioned, the present embodiment employs a fingerprint as biometric information for verification, and referring to FIG. 3 and FIG. 4, an operation of fingerprint image capturing (sweep) by the sweep-type fingerprint sensor 10 and partial images successively captured by the sweep-type fingerprint sensor 10 will be described hereinbelow.

Partial fingerprint images (hereinafter will be called "partial images"), which are obtained by a fingerprint sensor 10 whose sensor surface 11 is sufficiently smaller than a human finger 200, are put together to obtain information of the whole fingerprint image, and for this purpose, at least relative position information between the individual partial images is required.

Figure 3:
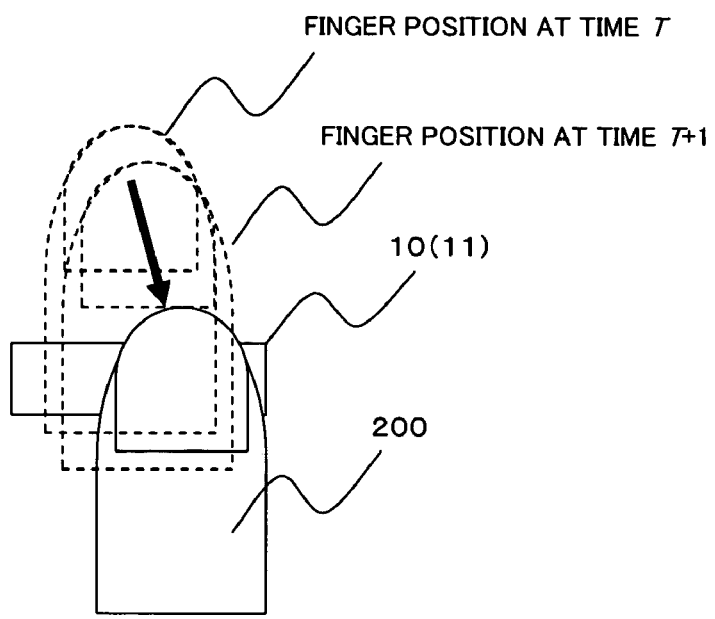
FIG. 3 is a view for describing a process (sweep action) of capturing a fingerprint image with a sweep-type fingerprint sensor.
Figure 4:
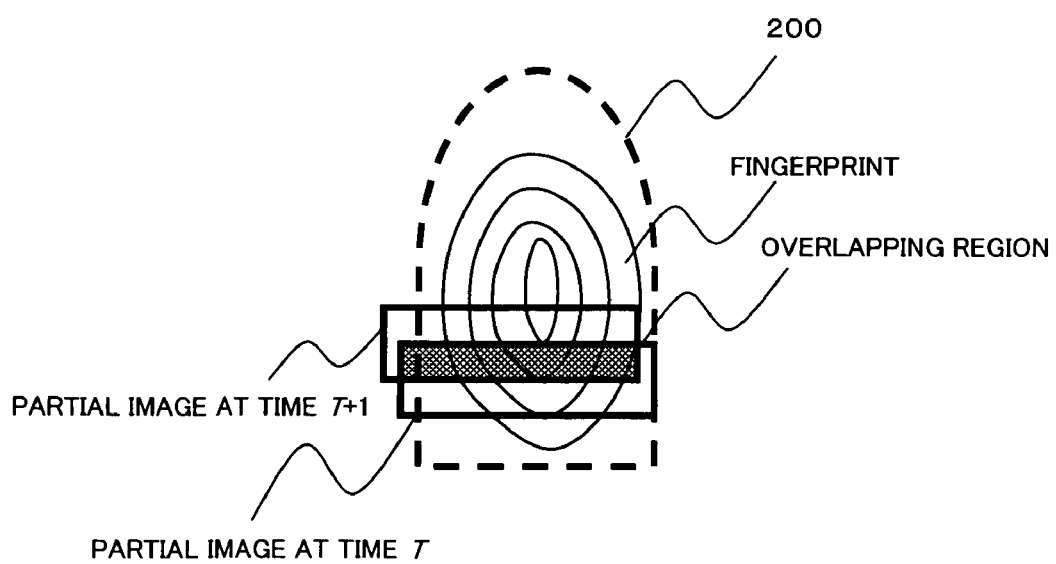
FIG. 4 is a view for describing partial images successively captured by a sweep-type fingerprint sensor.

FIG. 3 and FIG. 4 show how the fingerprint sensor 10 captures partial images of a fingerprint from the side of the finger root to the side of the tip of the finger over time. For example, if a partial image captured at time T and a partial image captured at time T+1 share a common overlapping area of a sufficient size, almost the same pattern appears in the overlapping area. That is, the partial images are put together so that the same pattern contained therein overlaps, whereby a fingerprint image of a larger area is obtained. At this time, based on a partial image obtained at a certain time point, relative position information between partial images obtained later than the time point needs to be detected. Hereinafter, a process of gradually moving the image-capturing position in an almost fixed direction, as shown in FIG. 3 and FIG. 4, will be called "sweep".

Extremely similar patterns (for example, finger print ridge patterns) are repeated in partial images obtained by the fingerprint sensor 10. Thus, in order to accurately detect relative position information between the partial images, it is necessary to extract more unique portions of each partial image. Such characteristics are, as will be detailed later with reference to FIG. 13 through FIG. 15, for example, brightness gradient, the foreground or profiles of the foreground obtained by binary processing. Further, from a view point of characteristic fingerprint patterns, ridge endpoints and ridge bifurcations are also such characteristics.

In the present embodiment, characteristic extracting unit 20 extracts such characteristics, and using the thus extracted characteristics, relative position information detecting unit 30 detects relative position information between the individual partial images. At that time, if characteristics (ridge endpoints and ridge bifurcations in a fingerprint) needed for verification are extracted from the partial images, registration data and verification data are easily generated, without the necessity of reproducing the whole image.

Here, as a method for detecting the relative position information by the relative position information detecting unit 30, a publicly known method is used. For example, a value representing correlation is calculated while an overlapping area is successively changed, and a position where the correlation-representing value is optimal is detected as relative position information.

As already described in the background section, partial images are often distorted due to the delay property of the fingerprint sensor 10 and the plasticity of the finger 200. In addition, if the reproducibility is lacked in the direction (hereinafter will be called the "sweep direction") and in the speed (hereinafter will be called the "sweep speed") in which the finger 200 or the fingerprint sensor 10 moves, the distribution of the characteristics at the time of finger registration differs from the distribution of the characteristics at the time of fingerprint verification.

A common type of fingerprint sensor whose sensor surface (image capturing surface) is larger than a human finger always captures almost the same fingerprint image (for example, the image illustrated in FIG. 5) from the same finger.

On the other hand, when the fingerprint sensor 10 is used, the finger 200 is deformed by friction between the finger 200 and the sensor surface 11 in the direction opposite the sweep direction. If the finger 200 is moved relative to a secured sensor surface 11 by a sweep action, as shown in FIG. 6 and FIG. 7, the skin of the finger is stretched in the sweep direction, thereby enlarging ridge spacing, while the skin is shrunk in the opposite direction, thereby reducing the ridge spacing.

Figure 7:
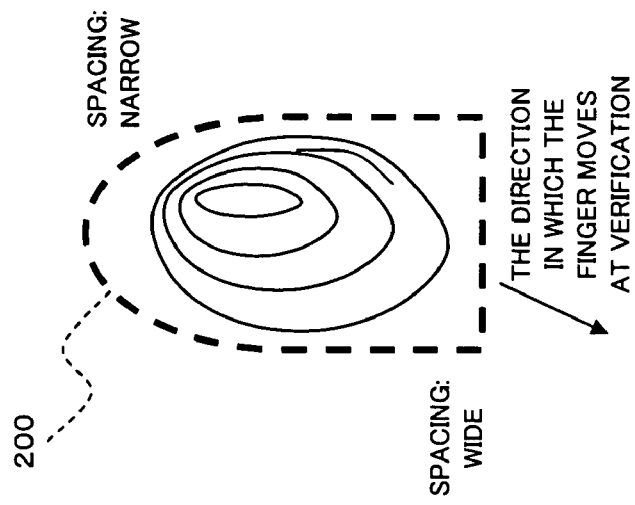
FIG. 7 is a view showing another example of the whole fingerprint image (captured from an object user at user verification) reproduced from partial images captured with a sweep-type fingerprint sensor.
Figure 6:
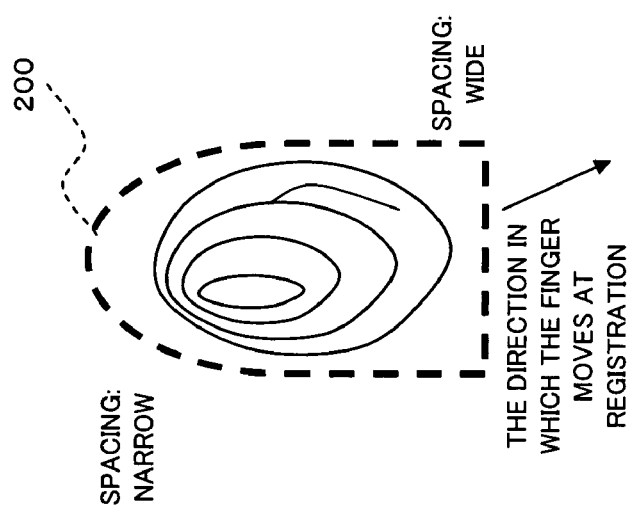
FIG. 6 is a view showing an example of a whole fingerprint image [captured when the fingerprint is registered (at user enrolment)] reproduced from partial images captured by a sweep-type finger print sensor.
Figure 5:
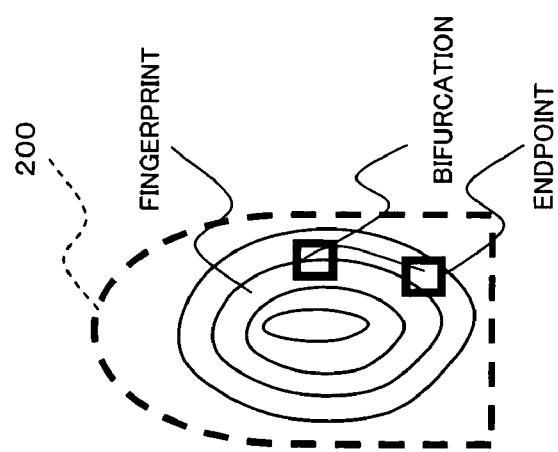
FIG. 5 is a view showing an example of a fingerprint image obtained by a typical fingerprint sensor.

The fingerprint data of FIG. 6 is obtained at fingerprint data registration while finger 200 is being moved with respect to the fingerprint sensor 10 in the lower light direction, and the fingerprint data of FIG. 7 is obtained at verification (user verification) while the finger 200 is being moved relative to the fingerprint sensor 10 in the lower left direction. The data show greatly different distribution of the characteristics even though the data are obtained from the same user, and positions of the characteristics do not agree between the registration data and the verification data. Hence, such deformation of the finger 200 which occurs at the time of capturing fingerprint data will deteriorate verification ability.

In the present embodiment, correcting unit 40 corrects and removes distortion due to such deformation, as will be detailed later with reference to FIG. 27 through FIG. 31, to improve the verification ability.

Further, in the present embodiment, the correcting unit 40 corrects and removes distortion (will be detailed later with reference to FIG. 19 through FIG. 26) due to the delay property of the fingerprint sensor 10, to improve the verification ability.

As already described, in the verification apparatus of the present embodiment, the characteristic extracting unit 20 detects relative position information between two successive partial images based on characteristics contained in a common overlapping area shared by the two images, and then, the correcting unit 40, as will be detailed later, corrects the positions of the characteristics in each partial image so that distortion due to finger deformation and due to the delay property of the fingerprint sensor 10 is removed. In addition, the registration/verification data generating unit 60 generates fingerprint data from the corrected characteristic information, and the generated data is registered in the non-volatile memory 91 as registration data and is used, as verification data, in a verification process performed by the verifying unit 70. With this arrangement, it is possible to obtain distortion-reduced fingerprint data, and user verification is performed using the high-quality fingerprint data, so that verification ability, that is, verification reliability, is improved.

At this time, since the correction is performed on characteristics extracted from each partial image by the characteristic extracting unit 20, it is not necessary to store each partial image as it is, so that undistorted fingerprint data can be obtained at high speed with a small memory capacity. Further, since relative position information of the extracted characteristics is used in verification, without use of partial images and the whole image as they are, highly reliable verification is performed while the amount of memory used is greatly reduced.

Further, in the present invention, each partial image in which the positions of the characteristics are corrected by the correcting unit 40 is sequentially subjected to the verification process performed by the verifying unit 70. This makes it possible to perform accurate fingerprint verification with a small-sized sweep-type fingerprint sensor 10, thereby realizing a highly convenient user verification system.

Furthermore, since it is not necessary to obtain the whole distribution of biometric information (fingerprint minutiae in the present embodiment) at the same time, fingerprint user verification is easily realized by a small-sized sweep-type fingerprint sensor 10, which can be equipped to small-sized information devices such as mobile phones and PDAs, which are so small that it is difficult to mount sensors in them, so that security is improved.

[2-2] Background Removing Function

Figure 8:
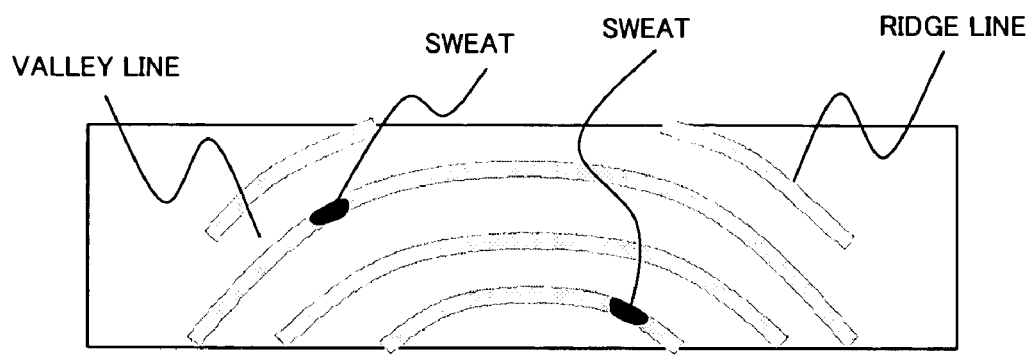
FIG. 8 is a view showing an example of a partial image captured without performing sweeping (while the finger is held still)
Figure 9:
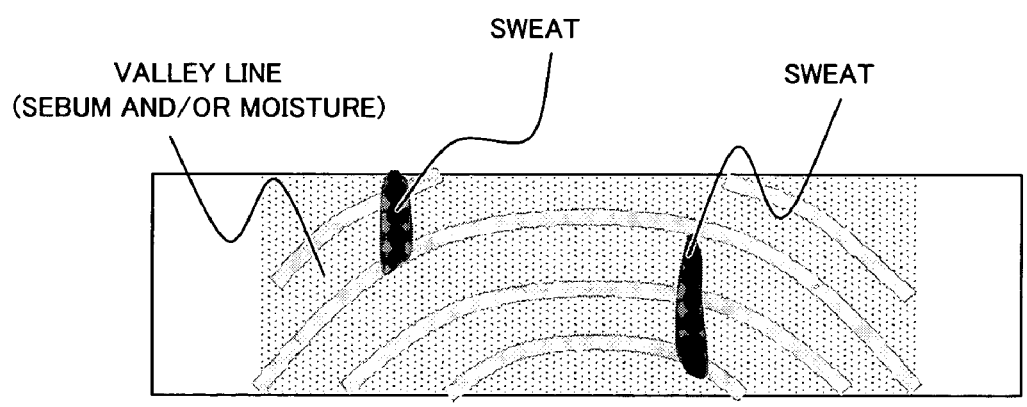
FIG. 9 is a view showing an example of a partial image captured during a sweep action.
Figure 10:
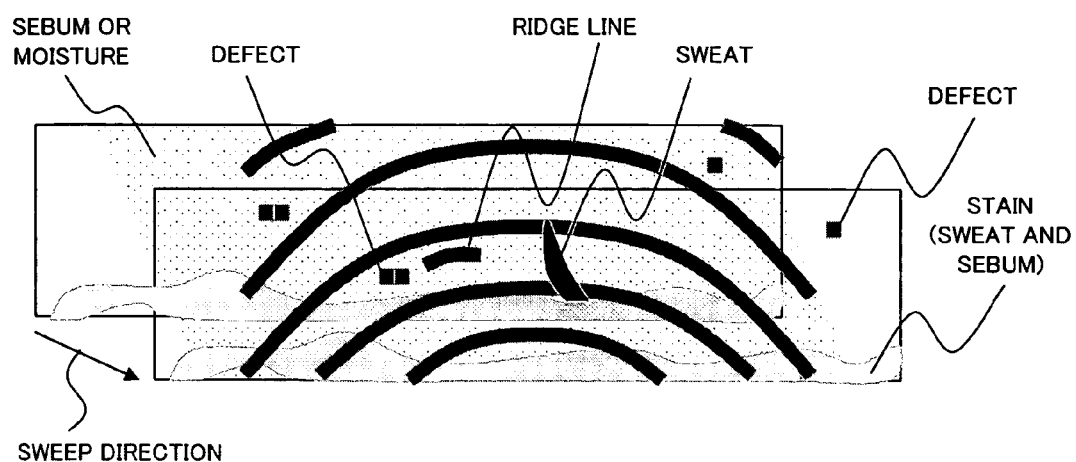
FIG. 10 is a view showing example partial images that are obtained when a defect and stains are present on the sensor surface.
Figure 11:
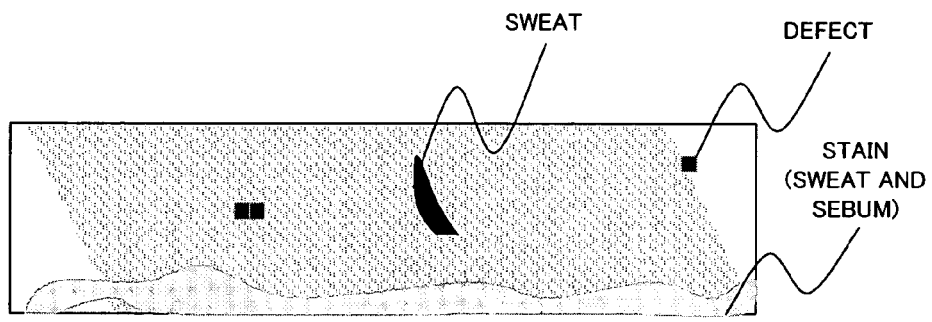
FIG. 11 is a view showing an average partial image captured when the defect and the stains of FIG. 10 are present.
Figure 12:
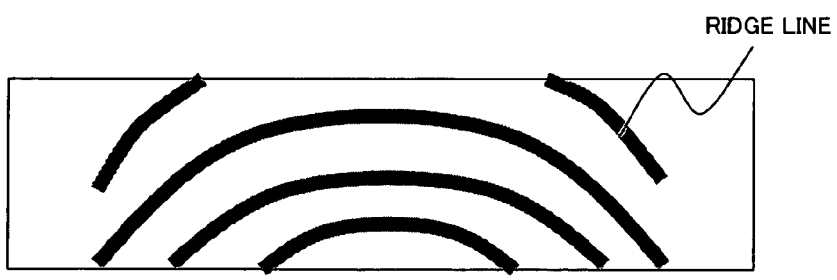
FIG. 12 is a view showing an example of a partial image in which non-moving patterns (images of defects and stains) are removed.

Next, referring to FIG. 8 through FIG. 12, a function of moving object detecting unit 50 as the aforementioned removing means (removing function) will be described hereinbelow. FIG. 8 is a view showing an example of a partial image obtained without performing a sweep action (finger 200 is halted); FIG. 9 is a view showing an example of a partial image captured during performance of a sweep action; FIG. 10 is a view showing example partial images that are obtained when a defect and stains are present on a sensor surface; FIG. 11 is a view showing an average partial image captured when the defect and stains of FIG. 10 are present; FIG. 12 is a view showing an example of a partial image in which non-moving patterns (images of defects and stains) are removed.

In the verification apparatus of the present embodiment, the aforementioned removing function removes patterns beforehand that are not moving objects, so that characteristics are not extracted from image information that does not reflect biometric information.

For example, a great number of sweat glands open through the surface (on the ridges) of finger 200, through which sweat glands sweat, sebum, and moisture are always secreted. Thus, if the finger 200 is moved on the sensor surface 11 of the fingerprint sensor 10 while being in contact with the sensor surface 11, secretions from the sweat glands adhere to the sensor surface 11. As a result, the sweep-type fingerprint sensor 10 captures images of such secretions as well as images of fingerprint ridges, and as shown in FIG. 9, for example, the secretions can be captured as low brightness patterns contained in a partial image.

As shown in FIG. 8, under a condition where no sweep action is performed (while finger 200 is halted), sebum and sweat adhering to portions where fingerprint ridges touch the sensor are detected as ridge patterns. On the other hand, under a condition where a sweep action is performed, sweat is trailed in the sweep direction, and its image is captured together with ridge images as shown in FIG. 9. Since this image of sweat has similar characteristics to ridge images, it is probable that characteristic information that does not actually exist in a fingerprint is extracted from the partial image of FIG. 9, so that verification ability is deteriorated. Here, the sweat adhering to the sensor surface 11 as shown in FIG. 9 becomes fainter as the sweep action of the finger 200 proceeds.

Further, in addition to such sweat images, images of sebum and moisture between ridges (that is, on valley lines) can lower the contrast between fingerprint ridges and valley lines, thereby deteriorating the verification ability.

Furthermore, if the sensor surface 11 has a flaw thereon, or if a detector device (cell) of the sweep-type fingerprint sensor 10 has a localized defect, or if a stain is on the sensor surface 11, these flaws, defects, and stains can exhibit similar brightness to the foreground (ridge images), depending on the property of the fingerprint sensor 10, as shown in FIG. 10. In such cases, the flaw, defect, and stain images deteriorate the accuracy in detecting relative position information, whereby the verification ability is also affected.

Accordingly, the verification ability is improved by removing such non-moving patterns before extraction of characteristics from the partial images by the characteristic extracting unit 20.

In order to remove non-moving patterns that do not move as the background, the moving object detecting unit 50 of the verification apparatus of the present embodiment utilizes a weighted average image.

As shown in FIG. 10, since moving objects (finger 200; actually, ridge images) are continually changing their positions, the possibility that the same ridge image appears at the same position in different partial images is extremely low. Thus, in a weighted average image (superimposed image) that is obtained from two or more partial images, images corresponding to ridges are averaged, and ridge image information (image intensity) becomes fainter.

In contrast to this, the background, which is a pattern that does not move, appears at the same position in two or more partial images as the same pattern. For example, if patterns of sebum, sweat, or moisture adhere to the sensor surface 11 as finger 200 sweeps over the sensor surface 11 as shown in FIG. 10, the patterns are wiped off as the finger 200 continues sweeping on the sensor surface 11, or the patterns stand still at the same position in different partial images. Thus, as shown in FIG. 11, in a weighted average image (superimposed image) that is obtained from two or more partial images, images corresponding to patterns that do not move are enhanced in comparison with the surroundings.

Thus, the moving object detecting unit 50 calculates a weighted average image of two or more partial images, for the purpose of detecting patterns which do not move like ridge images, as sweat or the like that are secreted from the biometric part (finger 200) and adhere to the sensor surface 11, or as a stain, defect or flaw. With use of this weighted average image, a fingerprint image (ridge image) is separated from a non-moving pattern image in partial fingerprint images captured by the fingerprint sensor 10, and the non-moving pattern images are removed from the partial images as shown in FIG. 12.

At this time, as described above, sweat and sebum adhering to the sensor surface 11 is wiped off by the finger 200 as its sweep action proceeds over time, or they are vaporized. As a result, they are not captured as images, so that their old image information becomes meaningless. Thus, in order to calculate a weighted average image G (i, j, K) that reflects non-moving patterns, always using the latest partial images, the following formula (1) is used:

$$G(i,j,K)=wF(i,j,K-k)+(1-w)G(i,j,K-1) \quad (1)$$

where $0<w<1$.

Using this formula (1), input image F(i, j, K−k) is multiplied by weight w(k), thereby obtaining weighted average image G(i, j, K) of n partial images, which is regarded as a non-moving pattern (that is, a background image). Here, n may be the number of images that are obtained within a specific time duration or within a specific distance. In addition, later partial images (that is, k is smaller) have larger weights w(k).

At this time, in order to reduce the time for calculation and the amount of memory used, the following formula (2) may be used in calculation of average image G(i, j, K) instead of the formula (1).

$$G(i,j,K)=\Sigma\{w(k)\cdot F(i,j,K-1)+G(i,j,K-1)\} \quad (2)$$

Any other calculation in conformity with the formulae (1) and (2) may also be used to calculate the weighted average image G(i, j, K), and it is clear that such formulae enhance patterns caused by a localized defect of the fingerprint sensor 10 as the background.

In order to remove non-moving patterns as the background, the following formula (3) is used to obtain image F'(i, j) in which the background is removed:

$$F'(i,j)=F(i,j)+w(M-G(i,j)), \text{ or}$$

$$F'(i,j)=F(i,j)+(M-w\cdot G(i,j)) \quad (3)$$

Where $0<x<1$, and M is the maximum quantization level.

Any other calculation in conformity with the formula (3) may be used to remove the background. With such calculations, even though the partial image of FIG. 10 is obtained, non-moving patterns (background images) are removed using the average image of FIG. 11, and partial images containing only moving images, that is, fingerprint ridge images, of FIG. 12 are obtained.

As another calculation method, using threshold Th, $$F'(i,j)=F(i,j) \; (G_{i,j},)<Th \; N(N: \text{ brightness regarded as the background})(G(i,j) \geq Th) \quad (4)$$

only in sensors in which ridges are detected in low brightness and valley lines are detected in high brightness.

As in formula (4), partial image F' in which the background is removed is calculated using G(i, j) as a mask, and any other calculation in conformity with this calculation may be also performed.

In this manner, since non-moving pattern images (background images) contained in each partial image are removed before extraction of characteristics, images such as those of sebum, sweat, and moisture and images of flaws on the sensor surface 11, and images due to defects of detector devices (cells) forming the fingerprint sensor 10 are removed from the partial images. This will surely prevent such non-moving images from appearing in the partial images as fingerprint patterns that do not actually exist on the surface of the finger 200, thereby preventing extraction of characteristic information unnecessary for verification. Thus, verification ability is further improved.

[2-3] Characteristics Extracted by the Characteristic Extracting Unit

Figure 13:
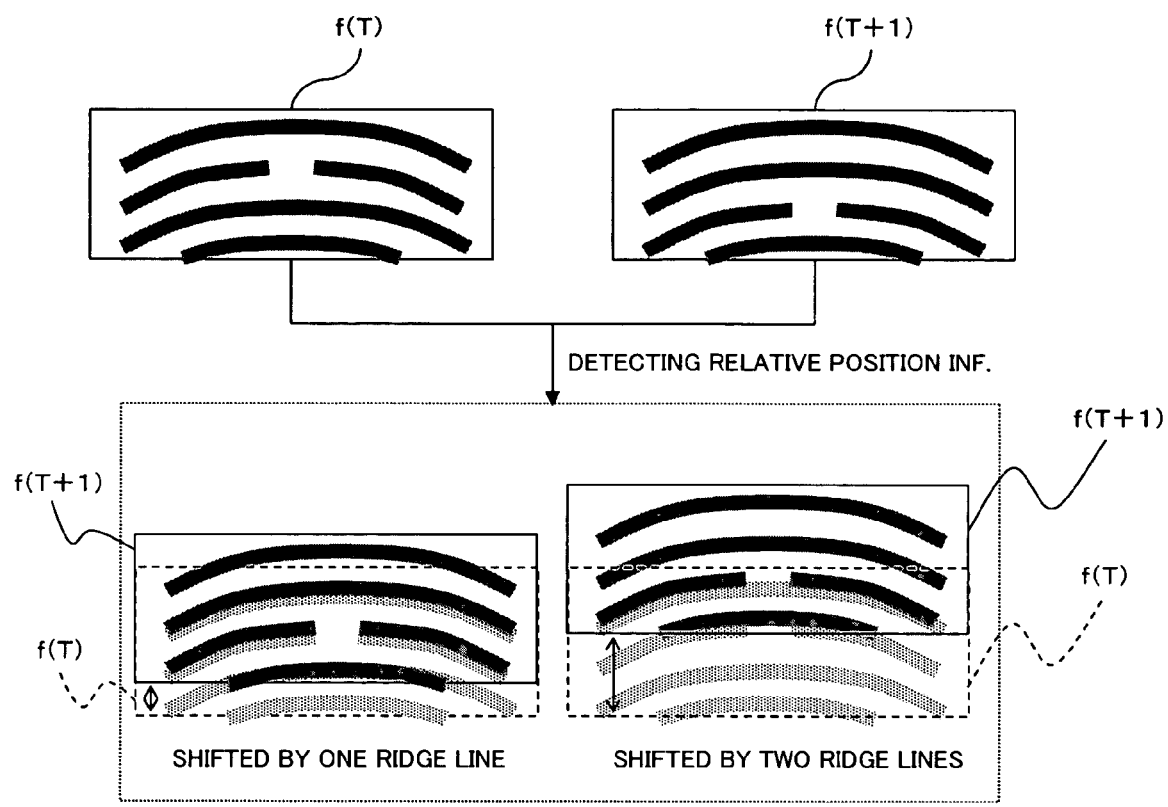
FIG. 13 is a view showing partial image examples in which detection of relative position information is difficult using just the foreground information.
Figure 14:
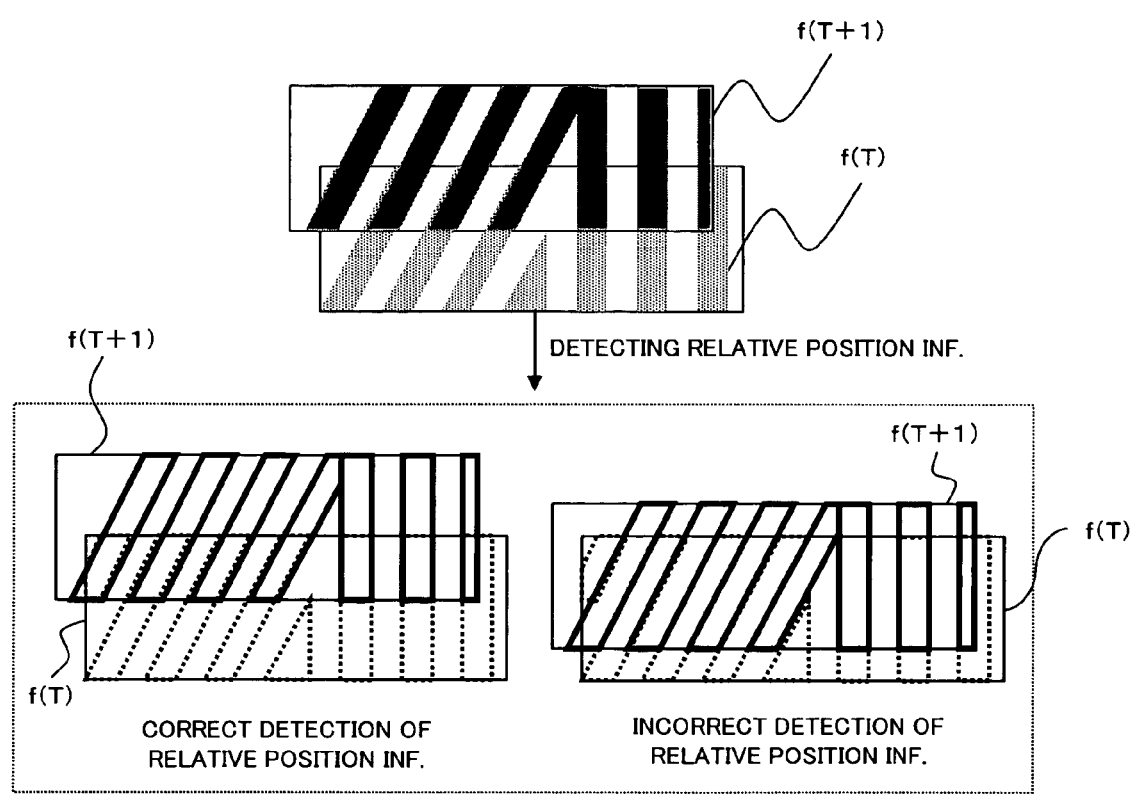
FIG. 14 is a view showing partial image examples in which detection of relative position information is difficult using just edge information.
Figure 15:
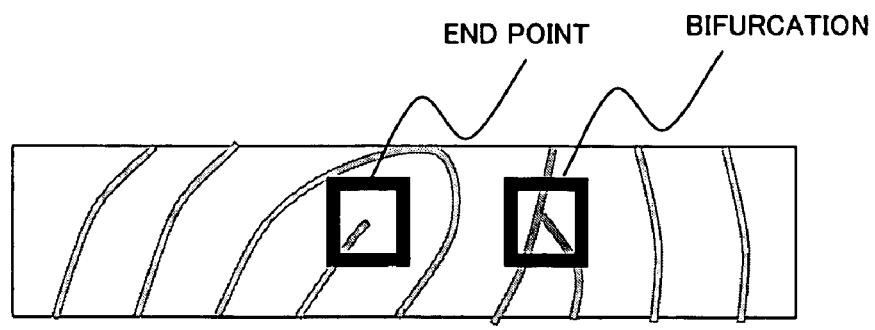
FIG. 15 is a view showing example minutiae, which are to be extracted from a partial image.

Referring to FIG. 13 through FIG. 15, a description will be made hereinbelow of characteristics extracted by characteristic extracting unit 20 of the present embodiment.

As characteristics for use in detecting relative position information between partial images, the characteristic extracting unit 20 extracts both of the foreground and the edges of the foreground, or minutiae (endpoints and bifurcations) of ridges, which are the foreground.

In the beginning, a description will be made of a case where the characteristic extracting unit 20 extracts both the foreground and its edges as characteristics.

Here, the foreground means portions that are detected as biometric information in partial images, in this case ridges in a fingerprint. The foreground may be brightness values in partial images as they are, or may be labeled values as the binarized foreground. The foreground edges are brightness gradient values, or may be labeled values as the profile of the foreground.

Fingerprint partial images generally contain ridge images with similar shapes. Thus, if relative position information between partial images is detected using only input partial images or their foreground, it is probable that a wrong position, which is shifted by one ridge line as shown in FIG. 13, is detected as relative position information, so that the performance of relative position detection is deteriorated. More precisely, in FIG. 13, f(T) is a partial image obtained at time T; f(T+1) is a partial image obtained at time T+1. If only the foreground information is used to detect relative position information between partial images f(T) and f(T+1), it is impossible to detect whether the relative position between the partial images f(T) and f(T+1) is a position shifted by one ridge line or a position shifted by two ridge lines.

In addition, as shown in FIG. 14, if only the edges are used to detect the relative position information, positions of ridges and valley lines arranged in a staggered configuration can be mistaken, so that the performance of relative position detection is deteriorated. Here, in FIG. 14, f(T) is a partial image obtained at time T; f(T+1) is a partial image obtained at time T+1.

Accordingly, if the foreground has higher characteristics than the background, and also if the edges have higher characteristics than the foreground, detection of relative position information using at least these two characteristics (the foreground and the edges) makes it possible to accurately detect relative position information between the partial images even when the partial images contain ridge images of similar shapes, so that the performance of relative position information detection is improved. Here, a publicly known sharpness enhancing filter will realize in principle similar effects and benefits to those that are realized by relative position detection which uses both the foreground and the edges.

Meanwhile, as shown in FIG. 15, the foreground (ridge image) is subjected to a thinning process and the characteristic extracting unit 20 extracts endpoints and bifurcations as characteristics in the thinned pattern. In this case, since these characteristics (endpoints and bifurcations) represent local shapes, the whole fingerprint image need not always be reproduced from the partial images. Input images themselves need not be stored in volatile memory 90 after characteristics are once extracted therefrom, and the partial images after extraction of the characteristics are thus abandoned, so that the amount of volatile memory 90 used is greatly reduced.

Further, as described above, ridge endpoints and bifurcations are extracted as characteristics, and the extracted characteristics are used to detect relative position information. As a result, when characteristic information (in a fingerprint, endpoints and bifurcations) is verified for user authentication, minutiae need not be extracted from the whole fingerprint image, so that the processing time is greatly reduced. Here, the characteristics such as endpoints and bifurcations can be detected by using an image of the size of the thick square frames of FIG. 15.

[2-4] Relative Position Information Detection

Figure 16:
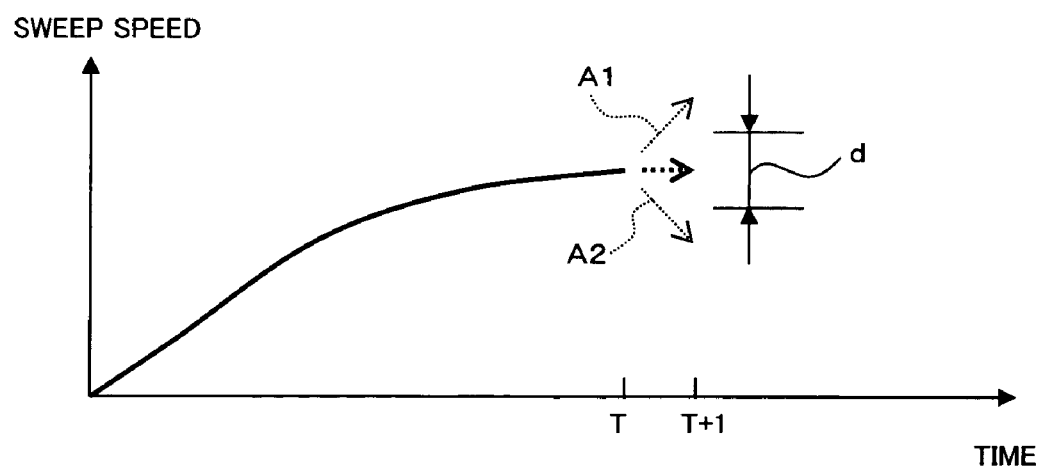
FIG. 16 is a view for describing a reason why the next search range can be determined (limited) based on relative position information that has been detected by the time immediately before the present detection.

Next, referring to FIG. 16 through FIG. 18, a description will be made hereinbelow of a process of detecting relative position information by relative position information detecting unit 30 of the present embodiment.

The relative position information detecting unit 30 detects relative position information between the current partial images based on one or more relative position information items which have been detected by the time immediately before the relative position information of the current partial images is detected, and this will reduce the number of times calculation is performed. That is, assuming that the sweep direction does not change greatly, a range (hereinafter will be called the "search range") in which values representing correlation are calculated for detecting relative position information is limited to a range which extends along the sweep direction, whereby the number of times calculation is performed is reduced, and the processing time for detecting the relative position information is shortened.

At this time, if an interval at which each partial image is obtained by fingerprint sensor 10 is sufficiently short, it can be assumed that the sweep direction will never be suddenly reversed. This is because none of the objects can move against the law of inertia. Hence, sufficient relative position detection ability is realized only by setting the search range so that it extends along the sweep direction. Further, if the image obtaining interval is sufficiently short, by assuming that the search range is equal to or smaller than one ridge, the number of times calculation is performed is further reduced, and the risk of erroneous detection of relative position information is also reduced.

In order to limit the search range at relative position information detection, the relative position information detecting means 30 detects relative position information of the current partial images, based on predicted relative position information to be detected next, the predicted relative position information being estimated based on one or more relative position information items which have been detected by the time immediately before the current relative position information is detected. This method can also reduce the number of times calculation is performed. That is, if an interval at which each partial image is obtained by fingerprint sensor 10 is sufficiently short, it can be assumed that the sweep direction and the sweep speed are never changed suddenly as indicated by arrow A1 and arrow A2 in FIG. 16. Accordingly, as shown in FIG. 16, the next search range (sweep speed ranged) can be predicted/limited based on relative position information which has been detected immediately before the detection of the current relative position information. This makes it possible to reduce the processing time required for detecting relative position information, and to realize sufficient ability of relative position information detection even though the search range is limited.

Sweep speed V is apparently obtained by the following formula (5):

$$V(K)=Pr(K)/I(K) \qquad (5)$$

where I(K) is a partial image capturing interval, and Pr (K) is relative position information.

Interval I(K) is time from the beginning of image capturing of one partial image to the beginning of image capturing of the next partial image.

Using the above formula (5), the next relative position information Pr'(K), which is predicted to be detected next, is obtained by the following formula (6)

$$Pr'(K)=V(K-1)*I(K), \text{K: integer} \qquad (6)$$

If the image obtaining interval is sufficiently short, by assuming that the search range is equal to or smaller than one ridge, the number of times calculation is performed is further reduced, and the risk of erroneous detection of relative position information is also reduced.

Here, if the partial image capturing interval I(K) is fixed, regardless of the time of image capturing, the previous relative position information Pr(K−1) can be used as it is, as shown in the following formula (7), and similar effects and benefits to those of formula (6) are realized.

$$Pr'(K)=Pr(K-1) \qquad (7)$$

This prediction method is effective in cases where change in the sweep speed is so gentle that the sweep speed can be regarded as fixed.

If the partial image capturing interval I(K) is fixed, and if change in the sweep speed is significant, relative position information Pr'(K) may be predicted by the following formula (8):

$$Pr'(K)=Pr(K-1)+\{Pr(K-1)-Pr(K-2)\} \qquad (8)$$

This formula (8) is effective in cases where change in speed {Pr(K−1)−Pr(K−2)} is fixed, that is, in cases where the acceleration is regarded as fixed. For example, if the formula (8) is applied to a case where the sweep speed gradually increases at initiation of a sweep action, the search range can be set properly.

Even if the image capturing interval I(K) cannot be regarded as fixed, if change in speed is taken into consideration in a similar manner to the above description, proper setting of the search range is available. For example, by applying change in speed to a quadratic expression by the least squares method, estimation is available with allowance made for change in speed. The expression to which the change in speed is applied is not limited to a quadratic equation, and the change in speed is also applicable to a polynomial expression. If the change in speed is applicable to a polynomial expression, estimation can be performed by a publicly known method other than the least squares method.

Figure 17:
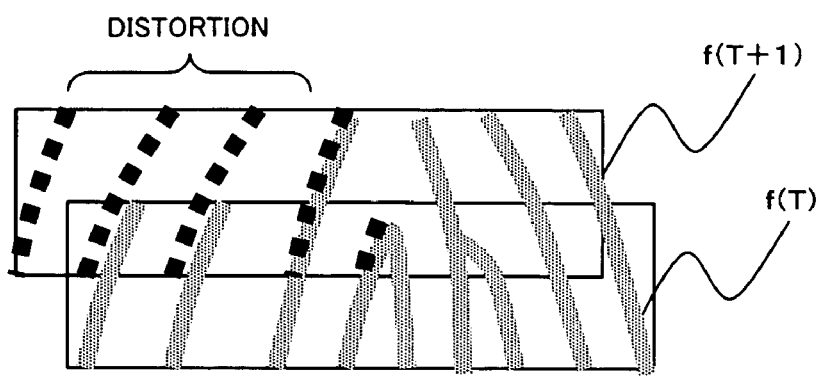
FIG. 17 and FIG. 18 are views for describing a relative position information detecting method when each partial image is divided into two or more regions which share a common overlapping area.
Figure 18:
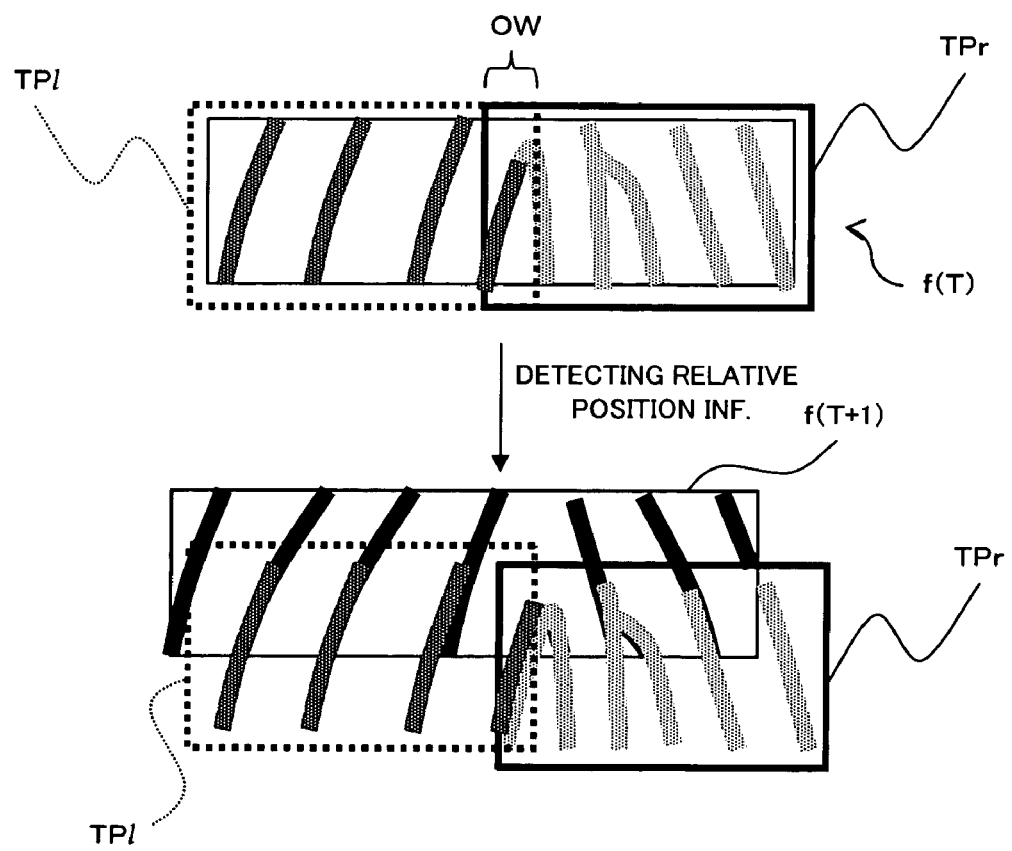

When relative position information detecting unit 30 detects relative position information between partial images, each partial image can be divided into two or more partial regions (two search templates TPl and TPr in FIG. 18) that share a common overlapping area (overlapping area OW) as shown in FIG. 18. The relative position information detecting unit 30 then detects the relative position information separately in the divided two or more partial regions. This realizes accurate detection of relative positional information even if a finger is significantly deformed as shown in FIG. 17 at the time of partial image capturing.

In FIG. 17 and FIG. 18, f(T) is a partial image obtained at time T; f(T+1) is a partial image obtained at time T+1. Two search templates TPl and TPr are so set as to divide the partial image f(T) into two, left and right, areas and the templates TPl and TPr share a common overlapping area OW, as shown in the upper image of FIG. 18.

The image in left template TPl contains comparatively few characteristics that can be used as agreement determiners in user verification, while the image in right template TPr contains ridge bifurcations and endpoints that can be used as agreement determiners in user verification.

As shown in FIG. 17, when ridge images are significantly distorted in the left side of the partial image f(T+1), which is obtained soon after the partial image f(T), due to friction between finger 200 and sensor surface 11, search templates TPl and TPr are separately used to detect relative position information, thereby making it possible to accurately detect relative position information of the two separate areas as shown in the lower image of FIG. 18.

At such detection of relative position, the reason why the two or more partial regions share a common overlapping area is to avoid deterioration of detection accuracy which is caused when one of the partial regions does not contain enough characteristics, as shown in FIG. 18, to detect the relative position information.

Although each partial image is divided into two partial regions that share a common overlapping area in the example of FIG. 18, the individual partial image may be divided into three or more regions (templates). Detection of relative position information is carried out in a similar manner to the above description.

[2-5] Image Distortion Due to Delay Property of Fingerprint Sensor and Correction of the Distortion Referring to FIG. 19 through FIG. 26, a description will be made hereinbelow of image distortion due to the delay property of fingerprint sensor 10, and of correction of the distortion by correcting unit 40 of the present embodiment.

If the fingerprint sensor 10 has a mechanism to detect the whole image information at the same time and to save the detected information in a buffer or the like, image distortion due to the delay property will never be caused, and thus, correction by the correcting unit 40 need not be performed.

Figure 24:
FIG. 24 is a view showing an example of a partial image (distortion due to expansion/contraction) captured under the condition of FIG. 22.
Figure 26:
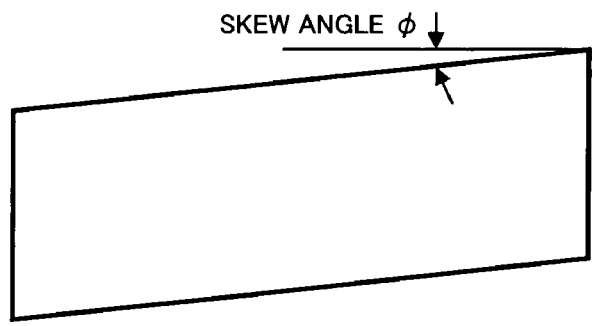
FIG. 26 is a view for describing a distortion (skew distortion) of a partial image captured under the condition of FIG. 25.

However, in fingerprint sensor 10 (see FIG. 19) in which an image is captured by each scanning line, expansive/contractive distortion in which the aspect ratio of the captured images is changed is caused as shown in FIG. 24. On the other hand, in fingerprint sensor 10 (see FIG. 20) in which an image is captured by each pixel (cell), skew distortion is caused as shown in FIG. 26.

Thus, the correcting unit 40 of the present embodiment corrects the positions of the characteristics in each partial image so that distortion of each partial image due to delay in image capturing by the fingerprint sensor 10 is corrected, based on the relative position information detected by the relative position information detecting unit 30, on a time interval at which the fingerprint sensor 10 obtains each partial image, and on a delay in capturing each partial image by the fingerprint sensor 10. As a result, the aforementioned image distortion (expansive/contractive distortion and skew distortion) is removed from characteristics information.

Figure 19:
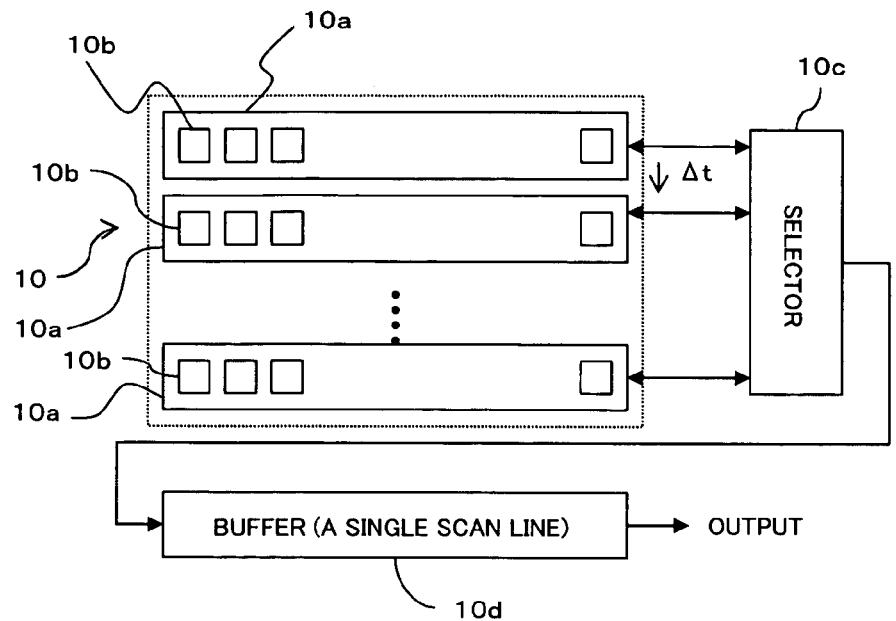
FIG. 19 is a block diagram showing an example of a construction of a sensor that is capable of reading every line of captured image data.

Here, FIG. 19 is a block diagram showing an example of a construction of a sensor that is capable of reading every line of captured image data. As shown in FIG. 19, the fingerprint sensor 10 has several line sensors 10a, each of which extends along the main scanning direction (the lateral direction in the drawing), aligned in parallel in the sub scanning direction (the vertical direction in the drawing). Each line sensor 10a contains numerous cells aligned in the main scanning direction. Image information obtained by the line sensors 10a is sequentially selected by selector 10c, and is read out to buffer 10d for each line sensor 10a (each scanning line), and is output to the outside.

Figure 20:
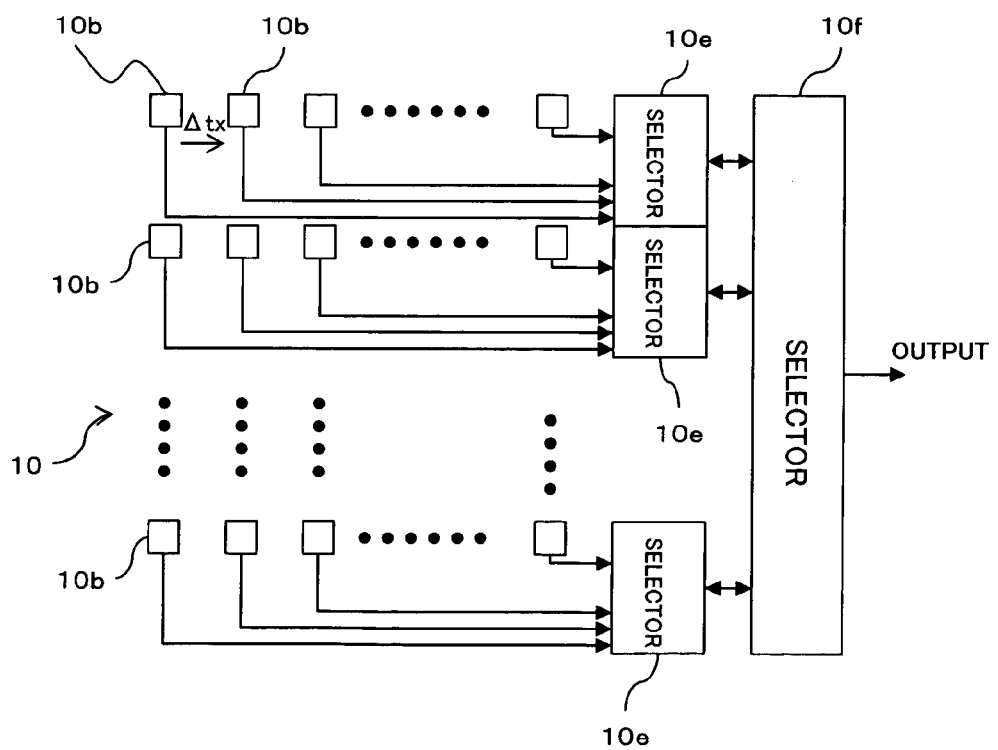
FIG. 20 is a block diagram showing an example of a construction of a sensor (an example in which a delay of each pixel needs to be considered) that is capable of reading every pixel of captured image data.

FIG. 20 is a block diagram showing an example of a construction of a sensor (an example in which delay of each pixel cannot be ignored) that is capable of reading every pixel of captured image data. As shown in FIG. 20, the fingerprint sensor 10 is formed of numerous cells 10b arranged in a matrix form. Further, image information captured by the numerous cells 10b is sequentially selected by the two-stage selectors 10e and 10f, and is read out to the outside for each cell 10b (each pixel).

The fingerprint sensor 10 of FIG. 19 reads image information by each scanning line (each line sensor 10a), and a delay (biometric information detection delay time; a delay due to the property of the biometric information input means, that is, the fingerprint sensor 10) is caused between one scanning line and the next scanning line.

Figure 21:
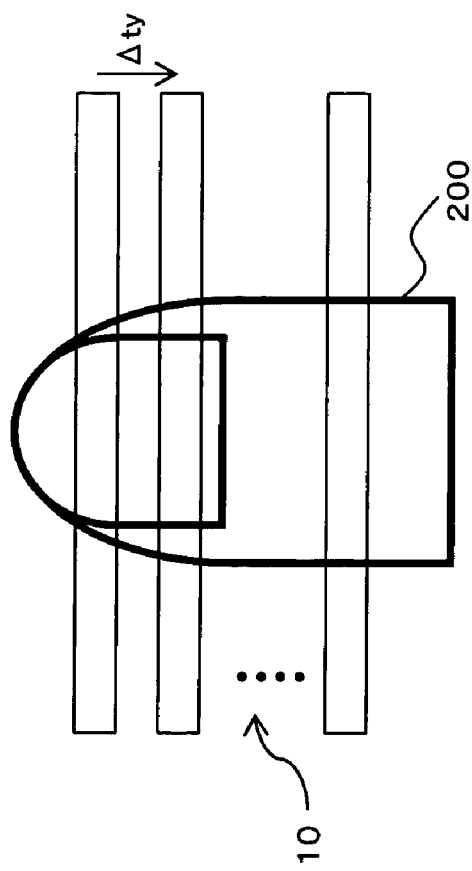
FIG. 21 is a view showing a finger sitting still on the sensor of FIG. 19.
Figure 22:
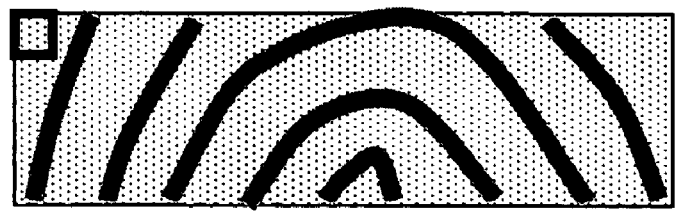
FIG. 22 is a view showing an example of a partial image captured under the condition of FIG. 21.

In such a fingerprint sensor 10, if partial images are obtained while the finger 200 is halted as shown in FIG. 21, the aspect ratio of the obtained partial images becomes "1" as shown in FIG. 22.

Figure 23:
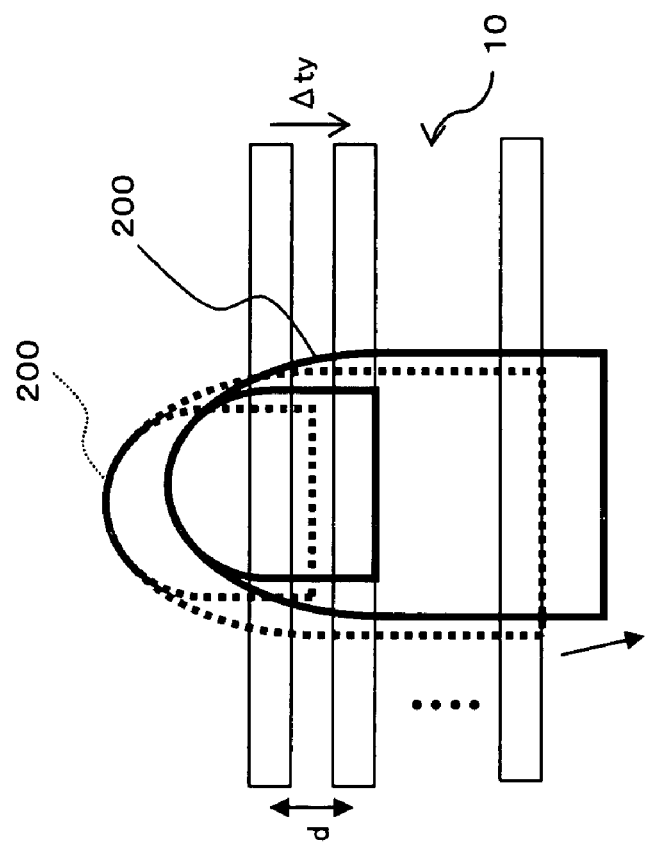
FIG. 23 is a view showing a finger sweeping on the sensor of FIG. 19.

Here, in the fingerprint sensor 10 of FIG. 19, it is assumed that the time required to read information from each pixel (cell 10b) is so short on one scanning line that it can be ignored, but that a delay Δt which is required to switch between object scanning lines is comparatively large. In such a fingerprint sensor 10, if an image is obtained while the finger 200 is sweeping in the sub scanning direction, the aspect ratio changes according to the speed of the finger 200, so that the image is distorted. This is because scanning interval d is apparently d'(≠d). If the finger 200 moves in the sub scanning direction, as shown in FIG. 23, sub scanning speed Vs is apparently Vs' Here, such apparent scanning speed Vs' is given by the following formula (9):

$$Vs'=Vs-Vf \quad (9)$$

The sub scanning speed Vs is obtained by $$Vs=d/\Delta t \quad (10)$$

where d is a scanning interval and Δt is a delay, and apparent sub scanning speed Vs' is given by $$Vs'=d'/\Delta t \quad (11)$$

When the rate of expansion in the sub scanning direction is E, $$d'=Ed \quad (12)$$

$$E=d'/d=Vs'\Delta t/(Vs\Delta t)=(Vs-Vf)/Vs \quad (13)$$

Thus, the aspect ratio is changed. The above formulae (11) and (12) indicate that the greater the speed at which the finger 200 moves in the sub scanning direction, the shorter the apparent scanning line interval. Assuming that the aspect ratio is not changed, an image appears expanded. On the other hand, the above formulae (11) and (12) indicate that the greater the speed at which the finger 200 moves in the direction opposite the sub scanning direction, the longer the apparent scanning line interval d. Assuming that the aspect ratio is not changed, an image appears contracted.

However, since the speed Vf of the finger 200 cannot be obtained directly from an image, the speed Vf is obtained using the apparent speed Vf' of the finger 200. Here, Vf' is obtained by the following formula (14):

$$Vf'=\Delta Y'/I \quad (14)$$

where ΔY' is relative position information obtained by the relative position information detecting unit 30, and I is an input interval of the fingerprint sensor 10.

Here, ΔY' is calculated by regarding d' as d. The relationship between ΔY' and ΔY, corrected using the expansion rate E, is obtained by the following formula (15):

$$\Delta Y'=\Delta Y/E \quad (15)$$

From Vf=ΔY/I and the above formula (13), the following equation (16) is derived $$Vf'=\Delta Y'/I=\Delta Y/(IE)=Vf/E=VsVf/(Vs-Vf) \quad (16)$$

Accordingly, by solving the equation (16) for Vf, Vf is calculated by the following equation (17):

$$Vf=VsVf'/(Vs+Vf') \quad (17)$$

In this manner, the speed Vf of the finger 200 is expressed by the sub scanning speed Vs and the apparent speed Vf' of the finger 200.

Further, since the following equation (18) holds, the expansion rate E is expressed by the following equation (19) using Vf.

$$\Delta Y/I=(\Delta Y'/I)(Vs/(Vs+Vf'))$$

$$\Delta Y=(Vs/(Vs+Vf'))\Delta Y' \quad (18)$$

$$E=Vs/(Vs+Vf') \quad (19)$$

That is, the above equation (17) indicates the following: when relative position information ΔY' is detected, ΔY' is multiplied by Vs/(Vs+Vf'), whereby effects of change in the aspect ratio are removed. Accordingly, the image is expanded in the sub scanning direction Vs/(Vs+Vf') times to remove/correct image expansive/contractive distortion.

Figure 25:
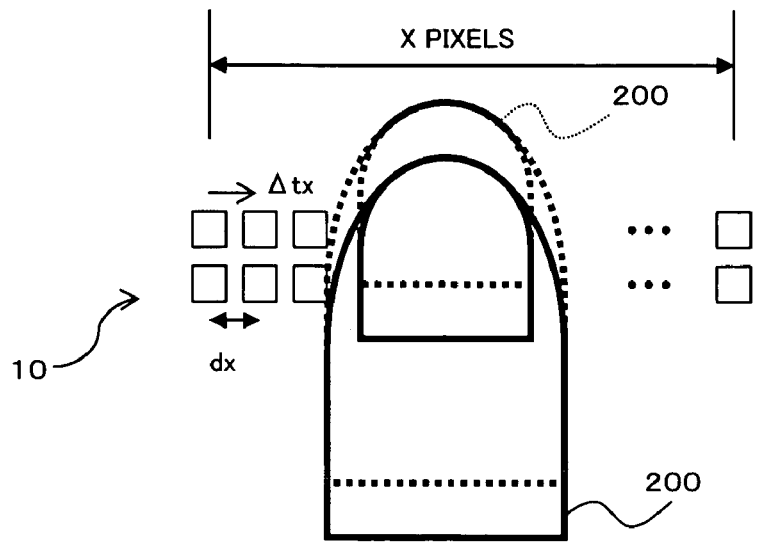
FIG. 25 is a view showing a finger sweeping on the sensor of FIG. 20.

Next, as shown in FIG. 20, a description will be made of cases where time Δtx required for reading information from pixels (cells 10b) and delay Δt at switching scanning lines cannot be ignored. As shown in FIG. 25, it is assumed that one scanning line includes X pixels (X cells). At this time, assuming that finger 200 travels at speed Vf, the finger 200 travels VfXΔtx pixels while pixel information is read from end to end of the scanning line. Assuming that the finger 200 travels in parallel with the sub scanning line, the image is distorted at a skew angle φ given by the following formula (20):

$$\varphi=a\tan(Vf\Delta tx) \quad (20)$$

Here, Vf is given by the above formula (17), and Vs=d/(XΔtx+Δty). The skew distortion is corrected by giving each pixel position an offset of −Xatan(VfΔtx) in the sub scanning direction.

The following is a description of a case where finger 200 moves in a slanting direction. When Vp is a main scanning speed, and Vfp' is an apparent speed of the finger 200 in the main scanning direction, an image needs to be expanded Vfp'Vp/(Vp+Vfp') times in the main scanning direction so as to correct distortion. That is, correction in the sub scanning direction is performed first, and skew distortion is then corrected, and correction in the main scanning direction is performed next. All of such correction is realized by image deformation process by affine transformation.

When an image is reproduced for demonstration, distortion of each partial image is corrected by affine transformation, as described above, and the partial images are then connected.

Here, if an image capturing interval is sufficiently short, distortion is almost the same among successive partial images. Thus, after connecting the partial images, the foregoing correction is performed in a limited area, thereby reducing the processing time.

As described above, the correcting unit 40 corrects the positions of the characteristics contained in each partial image so that distortion of each partial image due to delay in image capturing by the fingerprint sensor 10 is corrected. As a result, relative position information of the characteristics is obtained, so that image distortion (expansive/contractive distortion and skew distortion) due to detection delay of the fingerprint sensor 10 is removed from the characteristic information. This makes it possible to obtain undistorted characteristic information, so that deterioration in verification performance is avoided. Further, since user verification can be performed using high-quality characteristic information, verification ability, that is, verification reliability, is improved.

As described above, referring to FIG. 17 and FIG. 18, if the individual partial images, successively obtained by the fingerprint sensor 10, are divided into two or more regions which share a common overlapping area, and if the relative position information detecting unit 30 detects relative position information in each of the divided regions, the correcting unit 40 corrects the positions of the characteristics in each region so that distortion due to delay in image capturing by the fingerprint sensor 10 is corrected. That is, a correction coefficient is obtained from relative position information detected in each partial image, to correct image distortion. This is because the speed of the finger 200 depends on which part of the finger 200 touches the sensor surface. For example, the finger cushion moves slower than the surrounding portions thereof until the skin of the finger cushion is completely stretched. After the skin is stretched to the maximum, the finger cushion moves at the same speed as the surrounding portions. If the skin shrinks rapidly after such stretching of the skin, the finger cushion moves faster than the surrounding portions. Hence, since such difference in speed will cause different distortion, correction should be carried out in each region. In an overlapping area, a correction coefficient is obtained from an average value of relative position information that is obtained from each region. With this arrangement, even when the finger 200 is significantly deformed, relative position information of every portion of the finger 200 is accurately detected. Further, even if the fingerprint sensor 10 has any detection delay, it is possible to obtain undistorted (extractive/contractive distortion) characteristic information (registration fingerprint data or verification fingerprint data). Accordingly, verification ability, that is, verification reliability, is improved.

[2-6] Distortion Due to Finger Deformation and Correction of the Distortion

Referring to FIG. 27 through FIG. 31, a description will now be made of distortion due to deformation of a finger and of a method for correcting the distortion by correcting unit 40.

Figure 27:
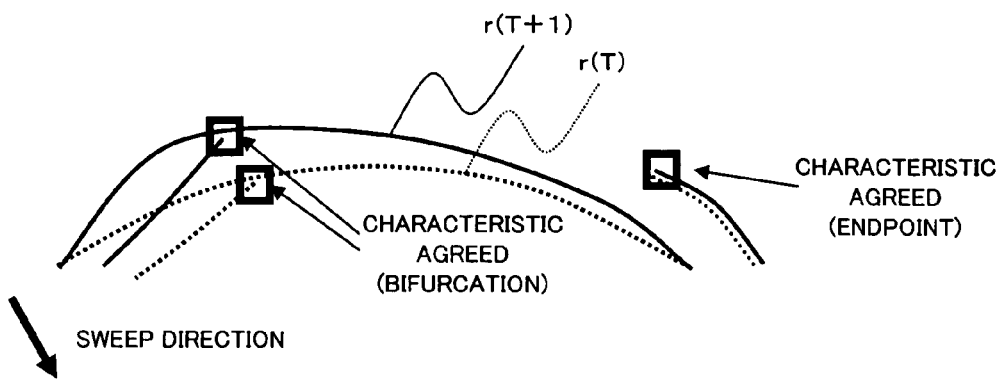
FIG. 27 through FIG. 29 are views for describing change in ridge images in partial images.
Figure 28:
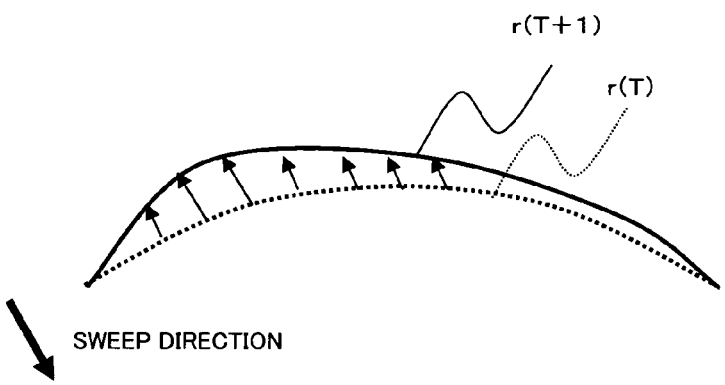
Figure 29:
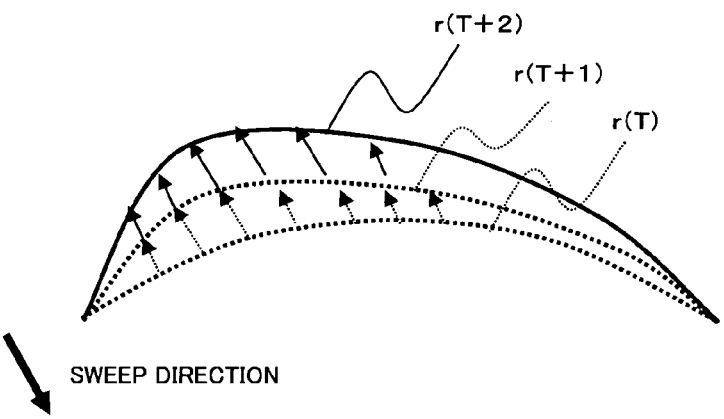
Figure 30:
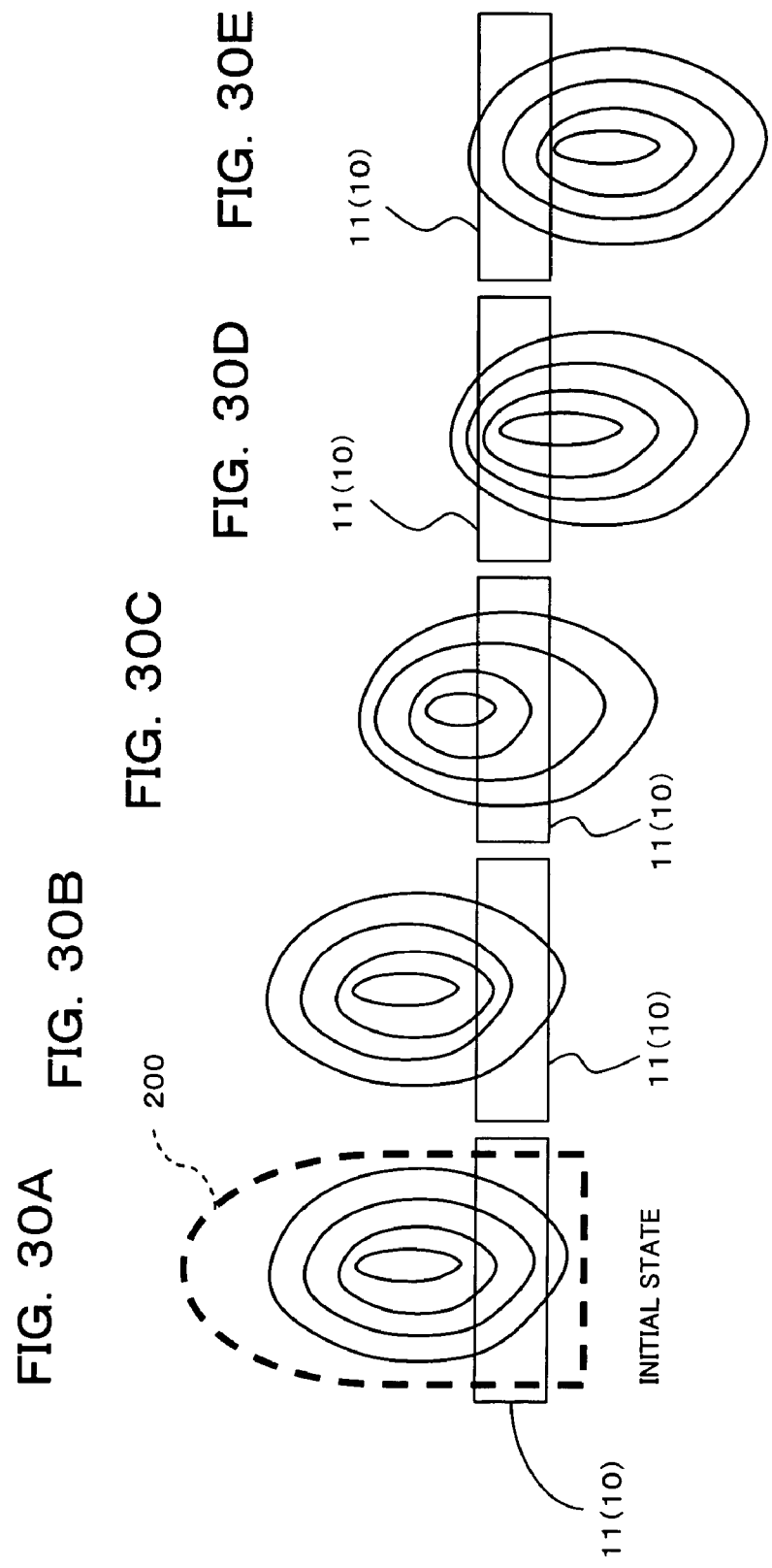
FIG. 30A through FIG. 30E are views showing transition of fingerprint deformation during a sweep action.
Figure 31:
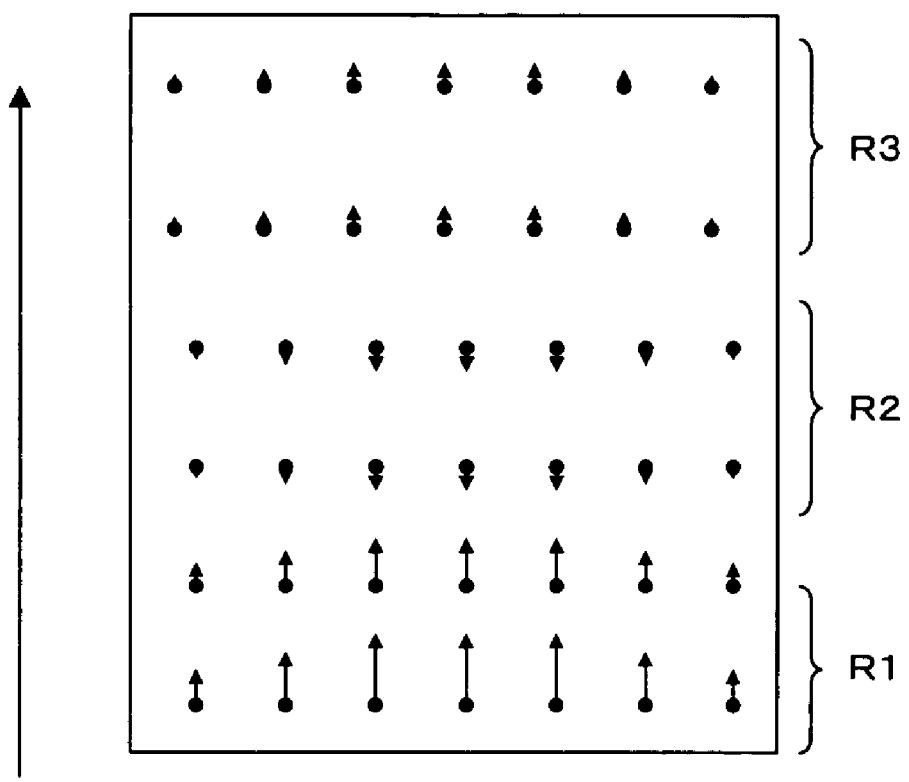
FIG. 31 is a view showing an example of distortion distribution of the present embodiment.

FIG. 27 through FIG. 29 are views for describing change in ridge images in partial images; FIG. 30A through FIG. 30E are views showing transition of fingerprint deformation during a sweep action; FIG. 31 is a view showing an example of distortion distribution of the present embodiment.

In FIG. 27 through FIG. 29, r(T) is a ridge image obtained at time T, r(T+1) is a ridge image obtained at time T+1, r(T+2) is a ridge image obtained at time T+2. These ridge images r(T), r(T+1), and r(T+2) are images of the same ridge contained in three partial images successively obtained by the fingerprint sensor 10.

Correcting unit 40 of the present embodiment estimates the amount of distortion based on relative position information detected by the relative position information detecting unit 30 and on positions of characteristics contained in each partial image. On the basis of the estimated distortion amount, the positions of the characteristics contained in each partial image are corrected, thereby removing distortion due to deformation of the finger itself caused when the fingerprint partial images are captured.

More specifically, if finger 200 deforms itself at different degrees when the successive partial images are captured, the deformation (the amount of distortion) of the finger 200 is estimated based on relative distance between the same characteristics contained in an overlapping area of the successive partial images. On the basis of the estimation result, positions of the characteristics are corrected.

Friction between the finger 200 and the sensor surface 11 acts on different portions as the finger 200 sweeps. Thus, as shown in FIG. 27, when successive partial images are compared, the distance of one characteristic between the successive partial images differs from the distance of another characteristic between the successive partial images. In FIG. 27, the distance between the bifurcations on the left is greater than the distance between the endpoints on the right. That is, the amount of distortion due to friction is not uniform in the same partial image, and the amount depends on the positions of the characteristics in the partial image. However, correction of such non-uniform distortion will increase the time required for correction processing, in comparison with the case where the whole of the partial image is uniformly corrected. Therefore, the correcting unit 40 corrects only characteristics extracted by characteristic extracting unit 20, whereby verification ability is improved and the correction process can be completed in a short time.

As shown in FIG. 28 and FIG. 29, friction is caused in the sweep direction, thereby causing fingerprint ridges to become deformed. Thus, characteristics which match to each other are searched for in the sweep direction in an overlapping area of successive partial images. Here, since the correlation in a portion in which deformation occurs is lower than the correlation in a portion in which no deformation occurs, a relative position detected by the relative position information detecting unit 30 serves as the reference point of measurement of the distortion amount.

At this time, as shown in FIG. 30A through FIG. 30E, the distortion of the finger 200 due to deformation propagates during the time from the beginning of a sweep action to the end of the sweep action. Thus, the characteristics which match each other are corrected by using a summation of the amount of distortion. With such a summation, the distortion distribution of FIG. 31, for example, is obtained by the time the sweep action is completed.

In the distortion distribution of FIG. 31, region R1 is a region where a fingerprint image is obtained at initiation of a sweep action, and the region R1 is also a region of the middle part (finger cushion) of the finger 200. Since this middle part is comparatively soft, the amount of distortion gradually increases in the region R1. Region R2 is a region following the region R1. In the region R2, change in sweep speed is small, and the amount of distortion is also small. Region R3 is a region following the region R2, and the region R3 is the tip of the finger. The tip of the finger is comparatively less deformable, and distortion in the region R3 is thus comparatively small.

On the basis of the thus estimated distortion distribution, correcting unit 40 corrects positions of characteristics contained in each partial image, and the correcting unit 40 also obtains relative position information of the characteristics, whereby distortion due to deformation of a finger itself caused when partial fingerprint images are obtained is removed. This makes it possible to obtain undistorted characteristic information (registration fingerprint data and verification fingerprint data), and user verification can be performed using high-quality characteristic information, so that verification ability, that is, verification reliability, is improved.

[2-7] Moving Object Detecting Unit

Next, a description will be made hereinbelow of a moving image detecting unit 50 of the present embodiment.

When sweep-type fingerprint sensor 10 of the present embodiment is used to obtain successive partial images, fingerprint images (fingerprint ridge images) can be separated from pattern images (background images) that are not moving objects, based on the partial images obtained by the fingerprint sensor 10, as already described in section [2-2]. Moving object detecting unit 50 of the present embodiment utilizes the function that is described as a background removing function in section [2-2], to detect the presence or absence of a moving object (for example, finger 200; actual ridge images) that is moving relative to the fingerprint sensor 10. This eliminates the necessity of separately preparing a sensor for detecting a moving object, and moving objects are detected without giving rise to any costs, thereby improving practicality.

More precisely, as described in section [2-2], the moving object detecting unit 50 calculates a weighted average image $G(i,j,K)$ of partial images that have been obtained by the fingerprint sensor 10 by the time immediately before the current partial images are obtained, by using the foregoing formulae (1) and (2). The moving object detecting unit 50 calculates the difference value between the thus calculated weighted average image $G(i,j,K)$ and the latest partial image $F(i,j,K)$. If the difference value exceeds a specific threshold, it is judged that a moving object (ridge images, that is, finger 200) is detected.

At this time, when non-moving patterns (background) are removed, if the above weighted average image $G(i,j,K)$, calculated by the above removing function, is used as it is, it is possible to detect moving objects without increasing the amount of calculation performed by a verification apparatus (CPU 100).

In addition, if the above threshold value, which serves as the criteria of detection of the moving objects, is set to a value greater than a variation value caused by noise, the noise is surely prevented from being erroneously detected as moving objects, so that moving object detection ability is improved.

[2-8] Verification Process by the Verifying Unit

Next, a description will be made of verification process performed by verifying unit 70 of the present embodiment.

In the present verification apparatus, with a sweep action, characteristics are sequentially extracted/generated from partial images, and the verifying unit 70 is thus capable of initiating verification processing before the whole fingerprint image is obtained.

The verifying unit 70 of the present embodiment preferentially uses characteristics obtained from partial images that are captured earlier and relative position information of the characteristics, to perform verification processing, and the verifying unit 70 ends the verification process at the time a verification result is established.

With this arrangement, since characteristics are sequentially generated from partial images input by the sweep action, without waiting for the whole fingerprint image to be captured, it is possible to start verification processing before characteristics of the whole fingerprint are obtained. At the time the verification result is established, for example, at the time it is found that an object user is not an authorized user, the verification process is aborted at an early stage.

Further, since the verifying unit 70 need not perform verification processing for non-moving objects, the verifying unit 70 does not perform verification processing while no moving object is detected by moving object detecting unit 50. That is, the verifying unit 70 does not initiate verification processing while no moving object is detected, and the verifying unit 70 performs verification processing only while any moving object is being detected.

This makes it possible to reduce the time and load required for calculation. In addition, since characteristic information extracted from noise is prevented from being used in verification processing, verification ability will not be deteriorated.

Here, while the moving object detecting unit 50 does not detect any moving object, the correcting unit 40 may not perform correction processing, and the relative position information detecting unit 30 may not perform detection process, whereby the time and load required for calculation is reduced.

[2-9] Friction Reducing Means

Next, referring to FIG. 32 through FIG. 35, in order to reduce friction caused by the movement of finger 200 which is in contact with sensor surface 11, there are provided friction reducing means 15 through 18 around the sensor surface 11 of the fingerprint sensor 10. FIG. 32 through FIG. 35 are perspective views schematically showing the friction reducing means 15 through 18 of the present embodiment.

Figure 32:
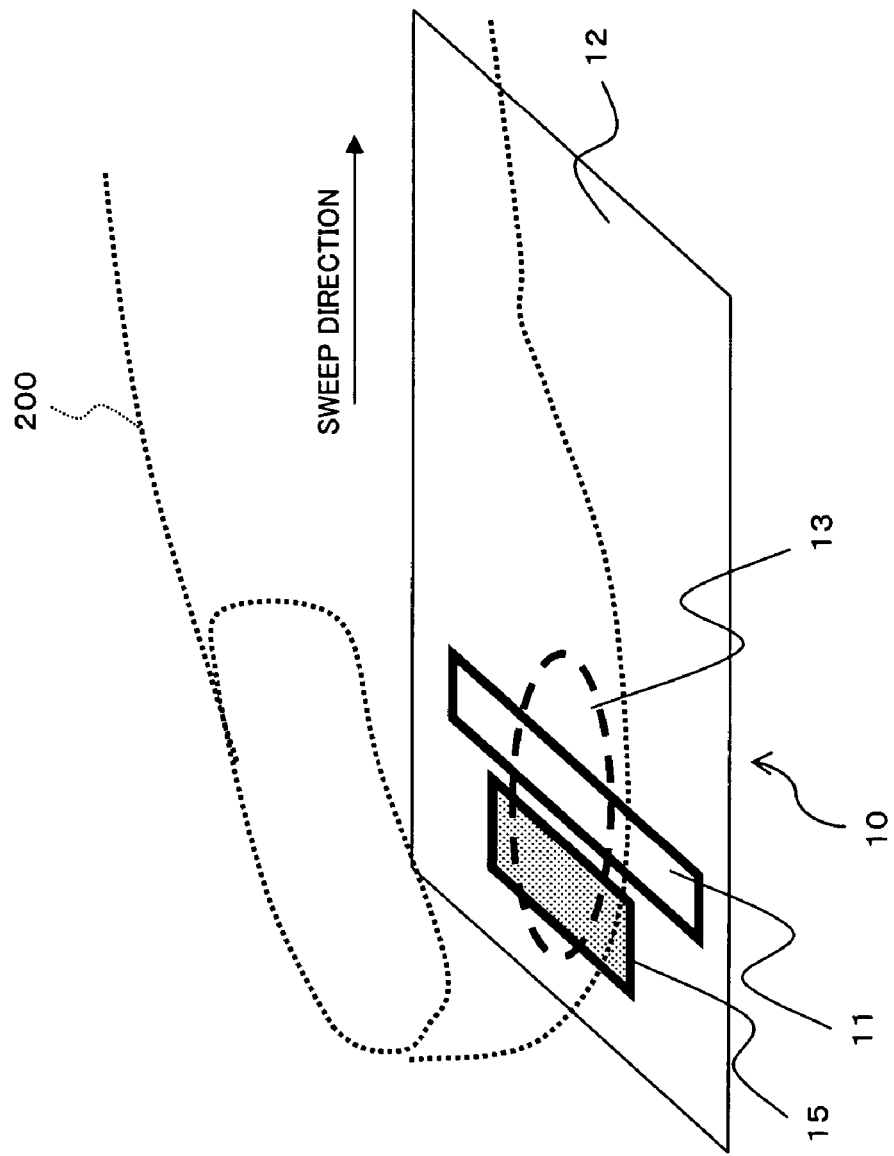
FIG. 32 is a perspective view schematically showing an example of a friction reducing means of the present embodiment.

The friction reducing means 15 of FIG. 32 is provided as a material with a small friction coefficient (small friction coefficient material), such as Teflon™, which is arranged on the cabinet surface 12 of the fingerprint sensor 10 in a finger contact area 13 on a fingertip side (the left side of the sensor surface 11 in FIG. 32).

With this arrangement, when a sweep action is performed, the friction reducing means 5 is placed between the tip of the finger 200 (fingertip side) and the cabinet surface 12. Even if pressure is applied to a fingertip at the sweeping action, deformation of the finger 200 which is caused by being stretched by friction is prevented.

If a friction reducing means made of the foregoing small friction coefficient material is provided also on the cabinet surface 12 of the fingerprint sensor 10, at a finger contact area 13 of the finger root side (the right side of the sensor 11 of FIG. 32), deformation of the finger 200 is more surely suppressed. In addition, this arrangement also surely restrains deformation of the finger 200 when the sweep direction of the finger 200 is not limited.

Figure 33:
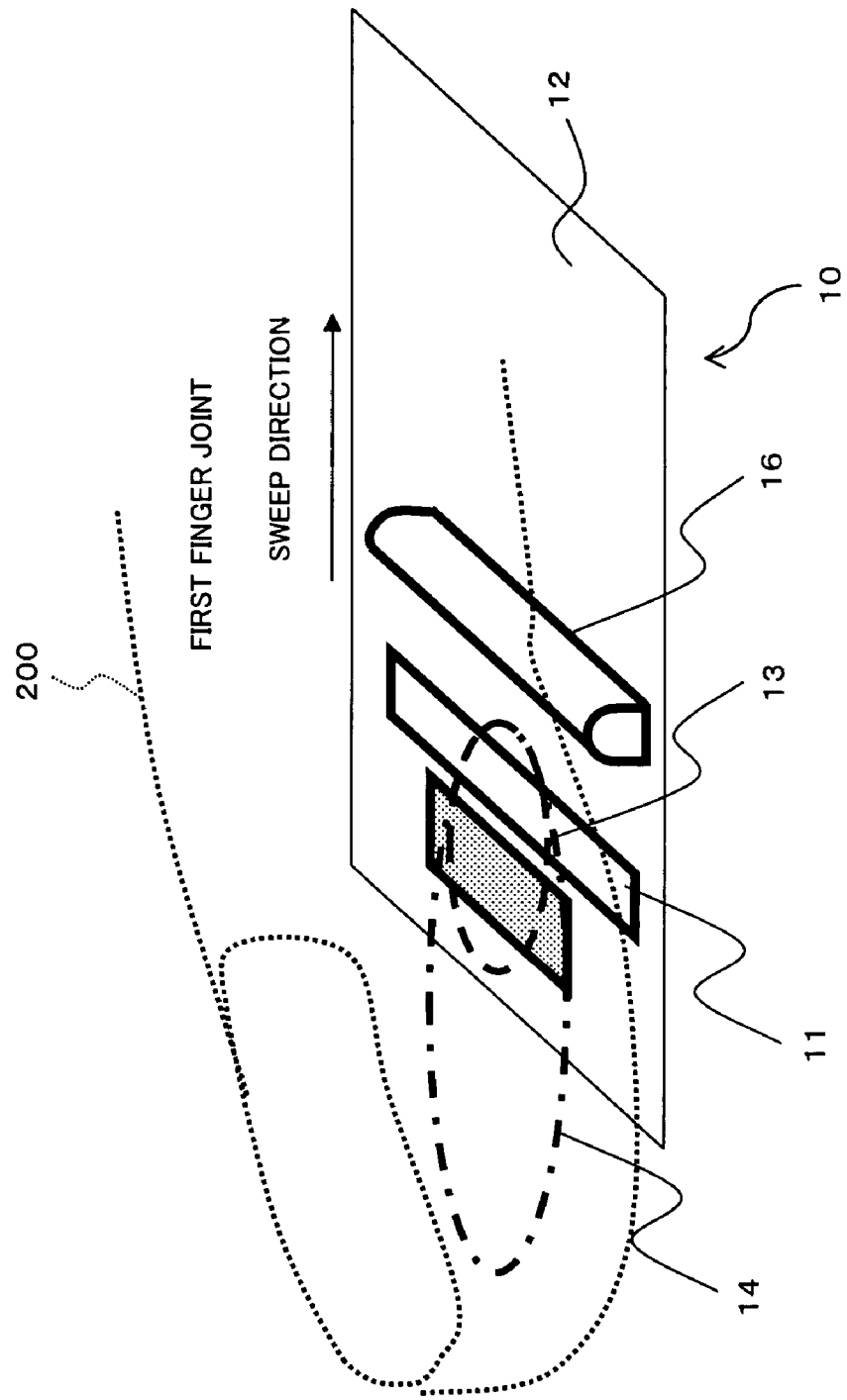
FIG. 33 is a perspective view schematically showing another example of a friction reducing means of the present embodiment.

Friction reducing means 16 of FIG. 33 is provided as a projection arranged on the cabinet surface 12 of the fingerprint sensor 10 which has a friction reducing means 15 the same as that of FIG. 32, the projection being placed at the finger root side of the finger 200 (the right side of the sensor surface 11 in FIG. 33).

This projection 16 is a long object extending in parallel with the lengthwise direction of the sensor surface 11, and the projection 16 projects from the cabinet surface 12 at a position away from a fingerprint capturing object area 14 at an appropriate distance. The projection 16 is arranged at a position where the first joint of the finger 200 is placed when fingerprint image capturing (sweep) is started. For example, the projection 16 is placed within 4 to 10 mm from the end (the left end in FIG. 33) of the fingerprint capturing object area 14.

The height of the projection 16 is such that the sensor surface 11 sufficiently contacts the finger 200 when the first joint of the finger 200 is placed on the projection 16 (for example, 0.2 mm to 1.0 mm), and the width of the projection is approximately the same as the width of the finger 200 (for example, around 10 mm). The cross section which is orthogonal to the lengthwise direction of the projection 16 is shaped like an inverted letter U, so that the finger 200 smoothly contacts the projection 16.

As the finger 200 is supported by the projection 16 while it sweeps, pressure is not applied to the contact surface between the sensor surface 11 and the finger 200, and contractive deformation of the finger 200 which is caused by friction between the finger root side and the cabinet surface 12 is prevented. Further, when the sweep direction of the finger 200 is not limited, deformation due to friction between a portion immediately before capturing and the cabinet surface 12 is reduced.

Figure 34:
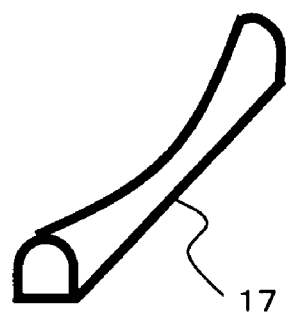
FIG. 34 is a view showing a first modified example of a projection which serves as a friction reducing means of the present embodiment.
Figure 35:
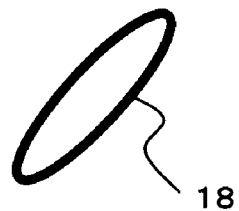
FIG. 35 is a view showing a second modified example of a projection which serves as a friction reducing means of the present embodiment.

As a friction reducing means, projection 17 of FIG. 34 and projection 18 of FIG. 35 may be provided instead of projection 16 of FIG. 33.

The height of the middle portion of the projection 17 of FIG. 34 is lower than the height of both ends of the projection 17. This shape of the projection 17 prevents the finger 200 from sliding sideways, so that fingerprint data (biometric information) is reliably obtained and stable verification becomes possible. Further, the projection 17 stretches the skin of the finger cushion, so that the finger 200 and the sensor surface 11 contact more stably.

The middle portion of the projection 18 of FIG. 35 is thicker than both end portions thereof, and this shape of the projection 18 stretches the skin of the finger cushion more strongly than the shape of the projection 17.

The foregoing friction reducing means 15 and the projections 16 through 18 also serve as markers indicating a position where the sweep action of the finger 200 should be started, thereby improving convenience.

As described above, if sweep-type fingerprint sensor 10 has friction reducing means 15 through 18, which reduce friction generated by sliding movement of the finger 200 on the sensor surface 11, the sweeping action of the finger 200 is easily performed, thereby improving convenience. In addition, since deformation of the finger 200 is reduced, biometric information images with high reproducibility are obtained, whereby verification ability is improved.

[2-10] Operation of the Verification Apparatus of the Present Embodiment

Figure 36:
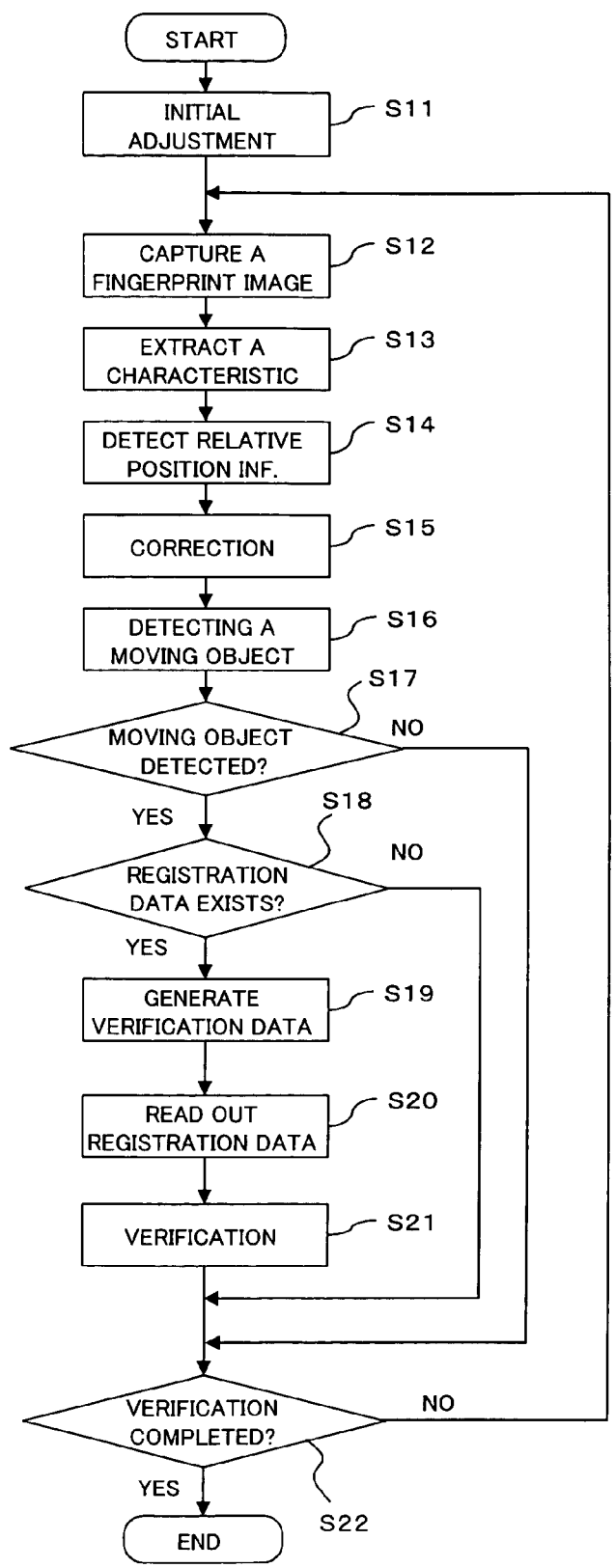
FIG. 36 is a flowchart for describing an operation of a verification apparatus of the present embodiment.

Referring to the flowchart (steps S11 through S22) of FIG. 36, an operation (of user authentication) of the verification apparatus of the present embodiment will be described hereinbelow.

First of all, initial adjustment of the sweep-type fingerprint sensor 10 is performed (step S11). At this initial adjustment, gain adjustment for appropriate detection of fingerprint information, for example, is performed. Further, for the purpose of preventing the moving object detecting unit 50 from erroneously detecting noise at detection of moving objects, a weighted time average image of partial images that are successively obtained by the fingerprint sensor 10 at an initial condition is generated. The average image is stored in volatile memory 90, and based on the average image, a threshold such that noise is not detected as a moving object is set. At this time, if a sweep action is not started and the finger remains at rest, the finger 200 may be placed on the sensor surface 11 of the fingerprint sensor 10.

After initial adjustment is performed, partial images captured by the fingerprint sensor 10 are stored in the volatile memory 90 one by one (step S12). Every time a partial image is captured, image capturing start time is read out from real time clock 80, and the image capturing start time is stored in the volatile memory 90 in association with the corresponding partial image.

The moving object detecting unit 50 generates a weighted time average image of partial images successively input, and performs background removal processing on the partial images. The characteristic extracting unit 20 extracts the foreground and edges, as image characteristics, from the partial images from which the background has been removed. The characteristic extracting unit 20 also extracts endpoints and bifurcations as fingerprint characteristics, which are then stored in the volatile memory 90 (step S13).

The relative position information detecting unit 30 detects relative position information between the partial images based on the characteristics extracted at step S13, and stores the relative position information in the volatile memory 90 in association with the partial images (step S14).

The correcting unit 40 calculates sweep speed using the relative position information detected at step S14 and the time stored at image capturing, and corrects the positions of the characteristics according to the delay property of the fingerprint sensor 10. The correcting unit 40 also estimates/detects the degree (distortion distribution) of deformation of finger 200, and corrects the positions of the characteristics according to the deformation degree (step S15).

Meanwhile, the moving object detecting unit 50 detects a moving object using a weighted time average image of the partial images successively input (step S16). At this time, the weighted time average image is that which is calculated at the background removal process at step S13. If the moving object detecting unit 50 detects any moving object (YES route of step S17), registration/verification data generating unit 60 checks whether or not registration data corresponding to an object user is stored in non-volatile memory 91 (step S18). If the registration data is stored therein (YES route of step S18), the registration/verification data generating unit 60 generates data for verification, in the order in which the partial images are input, based on the characteristics and the relative position information that are stored in the volatile memory 90 in association with the partial images, and the registration/verification data generating unit 60 sends the generated verification data to the verifying unit 70 (step S19).

Upon receipt of the verification data, the verifying unit 70 reads out characteristics from the non-volatile memory 91 in the order in which the characteristics were generated at generation of the registration data (step S20), and verifies the verification data against the registration data (step S21). This verification process by the verifying unit 70 is sequentially performed for each item of registration data until all the registration data is read out.

At the time all the registration data is read out from the non-volatile memory 91, if the registration data and the verification data do not contain any characteristics which match up, the result of the verification is regarded to be false (false user authentication), and the process ends (YES route of step S22). If a sufficient amount of verification data has not been obtained when input of verification data is completed (at completion of the sweep action of the finger 200), the verification is also regarded to be false (false user authentication), and the process ends (YES route of step S22).

If the verification result is not established/completed (NO route of step S22), the process returns to step S12, and similar procedures are repeated. Further, if it is judged that no moving object is detected at step S17 (NO route), or if it is judged that no registration data is stored at step S18 (NO route), the process moves to step S22, and it is evaluated whether to complete the verification. Furthermore, if the verification result is established by the verification process at step S21, before all the registration data is read out from the non-volatile memory 91, the verification process ends at that time (YES route of step S22).

[3] Other Modifications

The present invention should by no means be limited to the above-illustrated embodiment, but various changes or modifications may be suggested without departing from the gist of the invention.

For example, in the above embodiment, biometric information obtained for verification is a fingerprint obtained from a human finger. The present invention should not be limited to this, and the invention is also applicable to palm prints and blood vessel patterns obtained from a human palm, and like effects and benefits to those of the above description will also be realized. Further, the present invent is also applicable to muzzle patterns of cattle, and like effects and benefits to those of the above description will also be realized.

Further, although the fingerprint sensor of the above embodiment is a sensor of an electrostatic capacity type, a sensor of an optical type is also applicable.

INDUSTRIAL APPLICABILITY

Relative position information between two or more partial images is detected, and positions of characteristics contained in each partial image are corrected based on the amount of distortion that is estimated from the relative position information and positions of characteristics contained in each partial image. This makes it possible to obtain undistorted characteristic information, so that high-quality characteristic information can be used in user verification, and verification ability, that is, verification reliability, is thus improved. At this time, since correction is performed on characteristic information extracted from each partial image, it is not necessary to store the individual partial image as it is, so that undistorted characteristic information is obtained at high speed with use of a small amount of memory capacity.

Accordingly, the present invention is suitable for use in a system in which user verification is performed on an apparatus, such as small-sized information equipment, (for example, a mobile phone and a PDA), which is too small to be equipped with a sensor, and hence, the present invention is greatly useful.

What is claimed is:

1. A biometric information obtaining apparatus, comprising:

image obtaining means which captures a plurality of successive partial images of successive portions of biometric information from an object moving relative to said image obtaining means while keeping contact with an image capturing surface;

characteristic extracting means which obtains, from an individual partial image obtained by said image obtaining means, a characteristic contained in said individual partial image and a position of the characteristic;

relative position information detecting means which detects relative position information of two or more of the partial images, obtained by said image obtaining means, based on the characteristic contained in a region in which said two or more partial images overlap; and correcting means which obtains a distance between same characteristics existing in a region in which the two or more partial images overlap based on the relative position information detected by said relative position information detecting means and on the position of the characteristic in the individual partial image and then calculates an amount of distortion of the characteristic caused by deformation of the object resulting from a frictional force accompanying the contact movement of the object based on the distance, and which corrects the position of the characteristic in the individual partial image based on the calculated distortion amount so as to eliminate the distortion caused by deformation of the object resulting from the frictional force when said image obtaining means is capturing the plurality of successive partial images.

2. A biometric information obtaining apparatus as set forth in claim 1,
wherein said image obtaining means captures the plurality of successive partial images from an object that is moving with respect to said image obtaining means, and
wherein said biometric information obtaining apparatus further comprises removing means which removes a pattern image that is contained in the plural partial images captured by said image obtaining means and does not move, before said characteristic extracting means extracts the characteristic.

3. A biometric information obtaining apparatus as set forth in claim 1, wherein said characteristic extracting means extracts, as said characteristic, the foreground of the individual partial image and edges of the foreground.

4. A biometric information obtaining apparatus as set forth in claim 1, wherein said characteristic extracting means extracts, as said characteristic, an endpoint and a bifurcation in a pattern which is obtained by thinning the foreground of the individual partial image.

5. A biometric information obtaining apparatus as set forth in claim 1, wherein said relative position information detecting means detects the relative position information of the two or more partial images, which are captured successively by said image obtaining means, based on one or more relative position information items detected by the time immediately before the detection of the relative position information of said two or more partial images.

6. A biometric information obtaining apparatus as set forth in claim 1, wherein said relative position information detecting means detects relative position information of the two or more partial images, which are captured successively by said image obtaining means, based on a predicted relative position information to be detected next, said predicted relative position information being estimated based on one or more relative position information items detected by the time immediately before the detection of the relative position information of said two or more partial images.

7. A biometric information obtaining apparatus as set forth in claim 1, wherein said relative position information detecting means divides each of the two or more partial images, which are captured successively by said image obtaining means, into two or more partial regions which share a common overlapping area, and detects the relative position information separately in the divided two or more partial regions.

8. A biometric information obtaining apparatus as set forth in claim 1,
wherein said image obtaining means captures the plurality of successive partial images from an object that is moving with respect to said image obtaining means, and
wherein said biometric information obtaining apparatus further comprises moving object detecting means which detects the presence or absence of a moving object which is moving with respect to said image obtaining means, based on the plural partial images captured by said image obtaining means.

9. A biometric information obtaining apparatus as set forth in claim 1,
wherein said image obtaining means captures the plurality of successive partial images from an object that is moving with respect to said image obtaining means while being in contact with said image obtaining means, and
wherein said biometric information obtaining apparatus further comprises friction reducing means which is operable to reduce friction caused by the movement of the object.

10. A biometric information obtaining apparatus, comprising:
image obtaining means which captures a plurality of successive partial images of successive portions of biometric information from an object moving relative to said image obtaining means;
characteristic extracting means which obtains, from an individual partial image obtained by said image obtaining means, a characteristic contained in said individual partial image and a position of the characteristic;
relative position information detecting means which detects relative position information of two or more of the partial images, obtained by said image obtaining means, based on the characteristic contained in a region in which said two or more partial images overlap; and
correcting means which corrects the position of the characteristic in the individual partial image, based on a time interval at which said image obtaining means obtains the individual partial image, on a delay in capturing the individual partial image by said image obtaining means, and on the relative position information detected by said relative position information detecting means, thereby correcting distortion of the individual partial image caused by the delay in capturing the individual partial image, the delay occurring during a time from the start of capturing a single partial image to the end thereof, and relative movement of the object and the image obtaining means.

11. A biometric information obtaining apparatus as set forth in claim 10,
wherein said relative position information detecting means divides each of the two or more partial images, which are captured successively by said image obtaining means, into two or more partial regions which share a common overlapping area, and detects the relative position information separately in the divided two or more partial regions,
wherein said correcting means corrects the position of the characteristic in the partial regions separately, so that distortion of the individual partial image due to the delay in capturing the individual partial image by said image obtaining means is corrected.

12. A biometric information verification apparatus, comprising:
image obtaining means which captures a plurality of successive partial images of successive portions of biometric information of a user to be verified from an object moving relative to said image obtaining means while keeping contact with an image capturing device;
characteristic extracting means which obtains, from an individual partial image obtained by said image obtaining means, a characteristic contained in said individual partial image and a position of the characteristic;
relative position information detecting means which detects relative position information of two or more of the partial images, obtained by said image obtaining means, based on the characteristic contained in a region in which said two or more partial images overlap;

correcting means which obtains a distance between same characteristics existing in a region in which the two or more partial images overlap based on the relative position information detected by said relative position information detecting means and on the position of the characteristic in the individual partial image and then calculates an amount of distortion of the characteristic caused by deformation of the object resulting from a frictional force accompanying the contact movement of the object based on the distance, and which corrects the position of the characteristic in the individual partial image based on the calculated distortion amount so as to eliminate the distortion caused by deformation of the object resulting from the frictional force when said image obtaining means is capturing the plurality of successive partial images;

generating means which generates either or both of registration data and verification data for user verification, by using the characteristic extracted by said characteristic extracting means and the corrected position of the characteristic obtained by said correcting means; and verifying means which performs verification process, using either or both of the registration data and the verification data generated by said generating means, to verify the user.

13. A biometric information verification apparatus as set forth in claim 12, wherein said image obtaining means captures the plurality of successive partial images from an object of the user to be verified, which object is moving with respect to said image obtaining means, and wherein said biometric information obtaining apparatus further comprises removing means which removes a pattern image that is contained in the plural partial images captured by said image obtaining means and does not move, before said characteristic extracting means extracts the characteristic.

14. A biometric information verification apparatus as set forth in claim 12, wherein said characteristic extracting means extracts, as said characteristic, the foreground of the individual partial image and edges of the foreground.

15. A biometric information verification apparatus as set forth in claim 12, wherein said characteristic extracting means extracts, as said characteristic, an endpoint and a bifurcation in a pattern which is obtained by thinning the foreground of the individual partial image.

16. A biometric information verification apparatus as set forth in claim 12, wherein said relative position information detecting means detects the relative position information of the two or more partial images, which are captured successively by said image obtaining means, based on one or more relative position information items detected by the time immediately before the detection of the relative position information of said two or more partial images.

17. A biometric information verification apparatus as set forth in claim 12, wherein said relative position information detecting means detects relative position information of the two or more partial images, which are captured successively by said image obtaining means, based on a predicted relative position information to be detected next, said predicted relative position information being estimated based on one or more relative position information items detected by the time immediately before the detection of the relative position information of said two or more partial images.

18. A biometric information verification apparatus as set forth in claim 12, wherein said relative position information detecting means divides each of the two or more partial images, which are captured successively by said image obtaining means, into two or more partial regions which share a common overlapping area, and detects the relative position information separately in the divided two or more partial regions.

19. A biometric information obtaining apparatus as set forth in claim 12, wherein said image obtaining means captures the plurality of successive partial images from an object of the user to be verified, which object is moving with respect to said image obtaining means, and wherein said biometric information obtaining apparatus further comprises moving object detecting means which detects the presence or absence of a moving object which is moving with respect to said image obtaining means, based on the plural partial images captured by said image obtaining means.

20. A biometric information obtaining apparatus as set forth in claim 12, wherein said verifying means performs the verification process preferentially using the characteristic and the relative position information which are obtained from a partial image captured early in time by said image obtaining means.

21. A biometric information obtaining apparatus as set forth in claim 20, wherein said verifying means terminates the verification process at the time the verification result of the user is confirmed.

22. A biometric information obtaining apparatus as set forth in claim 12, wherein said image obtaining means captures the plurality of successive partial images from an object of the user to be verified, which object is moving with respect to said image obtaining means while being in contact with said image obtaining means, and wherein said biometric information obtaining apparatus further comprises friction reducing means which is operable to reduce friction caused by the movement of the object.

23. A biometric information obtaining apparatus, comprising:

image obtaining means which captures a plurality of successive partial images of successive portions of biometric information from an object moving relative to said image obtaining means while keeping contact with an image capturing surface;

characteristic extracting means which obtains, from an individual partial image obtained by said image obtaining means, a characteristic contained in said individual partial image and a position of the characteristic;

relative position information detecting means which detects relative position information of two or more of the partial images, obtained by said image obtaining means, based on the characteristic contained in a region in which said two or more partial images overlap; and correcting means which obtains a distance between same characteristics existing in a region in which the two or more partial images overlap based on the relative position information detected by said relative position information detecting means and on the position of the characteristic in the individual partial image and then calculates an amount of distortion of the characteristic caused by deformation of the object resulting from a frictional force accompanying the contact movement of the object based on the distance, and which corrects the position of the characteristic in the individual partial image based on the calculated distortion amount, and which corrects the position of the characteristic in the individual partial image, based on a time interval at which said image obtaining means obtains the individual partial image, on a delay in capturing the individual partial image by said image obtaining means, and on the relative position information detected by said relative position information detecting means, so that distortion of the individual partial image due to the delay in capturing the individual partial image by said image obtaining means is corrected so as to eliminate the distortion caused by deformation of the object resulting from the frictional force when said image obtaining means is capturing the plurality of successive partial images.

24. A biometric information obtaining apparatus, comprising:

image obtaining means which captures a plurality of successive partial images of successive portions of biometric information from an object moving relative to said image obtaining means while keeping contact with an image capturing surface;

correcting means which obtains a distance between same characteristics existing in a region in which two or more partial images overlap based on detected relative position information and on a position of a characteristic in an individual partial image and then calculates an amount of distortion of a characteristic of a partial image caused by deformation of the object resulting from a frictional force accompanying the contact movement of the object based on a distance, and which corrects the position of the characteristic in an individual partial image based on a calculated distortion amount so as to eliminate the distortion caused by deformation of the object resulting from the frictional force when said image obtaining means is capturing the plurality of successive partial images; and friction reducing means which is operable to reduce friction caused by the movement of the object.

25. A biometric information verification apparatus, comprising:

image obtaining means which captures a plurality of successive partial images of successive portions of biometric information of a user to be verified from an object moving relative to said image obtaining means;

characteristic extracting means which obtains, from an individual partial image obtained by said image obtaining means, a characteristic contained in said individual partial image and a position of the characteristic;

relative position information detecting means which detects relative position information of two or more of the partial images, obtained by said image obtaining means, based on the characteristic contained in a region in which said two or more partial images overlap;

correcting means which corrects the position of the characteristic in the individual partial image, based on a time interval at which said image obtaining means obtains the individual partial image, on a delay in capturing the individual partial image by said image obtaining means, and on the relative position information detected by said relative position information detecting means, thereby detecting distortion of the individual partial image caused by the delay in capturing the individual partial image, the delay occurring during a time from the start of capturing a single partial image to the end thereof, and relative movement of the object and the image obtaining means;

generating means which generates either or both of registration data and verification data for user verification, by using the characteristic extracted by said characteristic extracting means and the corrected position of the characteristic obtained by said correcting means; and verifying means which performs verification process, using either or both of the registration data and the verification data generated by said generating means, to verify the user.

26. A biometric information verification apparatus, comprising:

image obtaining means which captures a plurality of successive partial images of successive portions of biometric information of a user to be verified from an object moving relative to said image obtaining means while keeping contact with an image capturing surface;

characteristic extracting means which obtains, from an individual partial image obtained by said image obtaining means, a characteristic contained in said individual partial image and a position of the characteristic;

relative position information detecting means which detects relative position information of two or more of the partial images, obtained by said image obtaining means, based on the characteristic contained in a region in which said two or more partial images overlap;

correcting means which obtains a distance between same characteristics existing in a region in which the two or more partial images overlap based on the relative position information detected by said relative position information detecting means and on the position of the characteristic in the individual partial image and then calculates an amount of distortion of the characteristic caused by deformation of the object resulting from a frictional force accompanying the contact movement of the object based on the distance, and which corrects the position of the characteristic in the individual partial image, based on the calculated distortion amount and which corrects the position of the characteristic in the individual partial image, based on a time interval at which said image obtaining means obtains the individual partial image, on a delay in capturing the individual partial image by said image obtaining means, and on the relative position information detected by said relative position information detecting means, so that distortion of the individual partial image due to the delay in capturing the individual partial image by said image obtaining means is corrected so as to eliminate the distortion caused by deformation of the object resulting from the frictional force when said image obtaining means is capturing the plurality of successive partial images;

generating means which generates either or both of registration data and verification data for user verification, by using the characteristic extracted by said characteristic extracting means and the corrected position of the characteristic obtained by said correcting means; and verifying means which performs verification process, using either or both of the registration data and the verification data generated by said generating means, to verify the user.

27. A method for correcting distortion in an image, comprising:

capturing a plurality of successive partial images, using an image obtaining apparatus, of successive portions of biometric information from an object moving relative to the image obtaining apparatus while keeping contact with an image capturing surface;

detecting relative position information of two or more of the partial images based on an extracted characteristic contained in a region in which said two or more partial images overlap;

obtaining a distance between same characteristics existing in the region in which the two or more partial images overlap based on the relative position information and on a position of the characteristic in an individual partial image;

calculating an amount of distortion of the extracted characteristic caused by deformation resulting from a frictional force accompanying the contact movement of the object based on the distance; and correcting a position of the characteristic caused by deformation of the object in the partial image based on the distortion amount so as to eliminate distortion caused by deformation of the object resulting from the frictional force when the plurality of successive partial images are captured using the image obtaining apparatus.

* * * * *